United States Patent
Finger et al.

(10) Patent No.: US 10,996,309 B2
(45) Date of Patent: May 4, 2021

(54) RADIOVISION DEVICE

(71) Applicant: Universidad de Chile, Santiago (CL)

(72) Inventors: Ricardo Finger, Santiago (CL); David Monasterio, Santiago (CL); Christopher Muñoz, Santiago (CL); Roberto Fuentes, Santiago (CL); Nicolás Reyes, Santiago (CL); Leonardo Bronfman, Santiago (CL); Patricio Mena, Santiago (CL)

(73) Assignee: UNIVERSIDAD DE CHILE, Santiago (CL)

( * ) Notice: Subject to any disclaimer, the term of this patent is extended or adjusted under 35 U.S.C. 154(b) by 0 days.

(21) Appl. No.: 16/472,676

(22) PCT Filed: Dec. 21, 2017

(86) PCT No.: PCT/CL2017/050081
§ 371 (c)(1),
(2) Date: Jun. 21, 2019

(87) PCT Pub. No.: WO2018/112675
PCT Pub. Date: Jun. 28, 2018

(65) Prior Publication Data
US 2019/0369200 A1 Dec. 5, 2019

(30) Foreign Application Priority Data
Dec. 22, 2016 (CL) .................................. 3302-2016

(51) Int. Cl.
*G01S 3/72* (2006.01)
*G06T 11/20* (2006.01)
*G01S 3/78* (2006.01)

(52) U.S. Cl.
CPC ............... *G01S 3/72* (2013.01); *G01S 3/78* (2013.01); *G06T 11/206* (2013.01)

(58) Field of Classification Search
CPC ......................................................... G01S 3/72
(Continued)

(56) References Cited

U.S. PATENT DOCUMENTS

| 5,625,409 A | * | 4/1997 | Rosier | G01C 11/02 |
| | | | | 348/117 |
| 6,504,510 B2 | * | 1/2003 | Kim | H01Q 1/246 |
| | | | | 342/368 |

(Continued)

FOREIGN PATENT DOCUMENTS

| EP | 0144867 A2 | 6/1985 |
| EP | 0887879 A1 | 12/1998 |

(Continued)

OTHER PUBLICATIONS

International Search Report issued in PCT/CL2017/050081 dated Apr. 3, 2018.

(Continued)

*Primary Examiner* — Javid A Amini
(74) *Attorney, Agent, or Firm* — Procopio, Cory, Hargreaves & Savitch LLP

(57) ABSTRACT

This patent concerns a compact and portable system for real-time detection and location of electromagnetic emissions in the spectrum used by mobile devices (cell phones and Wi-Fi/Bluetooth devices). The principle of detection and location is based on phased array technology, which enables the synthesis of a directional radiation beam that can be electrically controlled in terms of both its shape and direction. This technology is used primarily in military and astronomical applications. The device also includes localization and control algorithms. This device will allow for detecting and locating electromagnetic emissions by means of an antenna beam scan within a field of view of 80×80 degrees. Once the detection and location have been estab- (Continued)

lished, the results are overlaid to a visual image captured by a video camera.

8 Claims, 10 Drawing Sheets

(58) Field of Classification Search
USPC .......................................................... 345/440
See application file for complete search history.

(56) References Cited

U.S. PATENT DOCUMENTS

| | | | | |
|---|---|---|---|---|
| 6,693,590 | B1* | 2/2004 | Toplicar | H01Q 3/26 342/372 |
| 7,602,337 | B2* | 10/2009 | Choi | H01Q 21/0018 342/375 |
| 9,083,449 | B2* | 7/2015 | Drost | H04B 10/00 |
| 9,560,060 | B2* | 1/2017 | Baxley | H04W 12/08 |
| 10,049,434 | B2* | 8/2018 | Mosher | G06T 5/002 |
| 2002/0173268 | A1* | 11/2002 | Heinzmann | H01Q 21/205 455/3.05 |
| 2003/0179138 | A1* | 9/2003 | Chen | H01Q 3/24 342/372 |
| 2007/0055140 | A1* | 3/2007 | Kuroda | G01R 33/4804 600/423 |
| 2007/0192910 | A1* | 8/2007 | Vu | G05D 1/0274 700/245 |
| 2008/0103695 | A1* | 5/2008 | Whiting | G09B 29/007 701/469 |
| 2008/0106467 | A1* | 5/2008 | Navarro | H01Q 21/061 342/372 |
| 2009/0027267 | A1* | 1/2009 | Carter | H01Q 3/46 342/372 |
| 2009/0102716 | A1* | 4/2009 | Sego | H01Q 21/0018 342/377 |
| 2009/0103595 | A1* | 4/2009 | Watanabe | G01S 7/526 375/219 |
| 2009/0146895 | A1* | 6/2009 | Drexler | H01Q 23/00 343/757 |
| 2010/0020166 | A1* | 1/2010 | Levine | G08B 21/12 348/82 |
| 2010/0135671 | A1* | 6/2010 | Park | H04J 14/02 398/172 |
| 2011/0273347 | A1* | 11/2011 | Wilkins | H01Q 21/065 343/749 |
| 2015/0022421 | A1* | 1/2015 | Vigano | H01Q 3/38 343/853 |
| 2015/0042505 | A1* | 2/2015 | Hope | G01S 5/06 342/41 |
| 2015/0123672 | A1* | 5/2015 | Ao | G01R 31/001 324/512 |
| 2015/0316641 | A1* | 11/2015 | Forstner | G01S 7/02 342/175 |
| 2016/0006121 | A1* | 1/2016 | El-Sallabi | G01S 3/14 342/443 |
| 2016/0087349 | A1* | 3/2016 | Lee | H01Q 5/42 342/373 |
| 2016/0214534 | A1* | 7/2016 | Richards | H04N 13/204 |
| 2016/0317621 | A1* | 11/2016 | Bright | A61B 17/3403 |
| 2017/0074664 | A1* | 3/2017 | Cheramie | H04N 7/188 |
| 2019/0000049 | A1* | 1/2019 | Bonutti | A01K 73/10 |

FOREIGN PATENT DOCUMENTS

| | | |
|---|---|---|
| EP | 0938156 A1 | 8/1999 |
| EP | 1195017 A2 | 4/2002 |
| EP | 1294163 A2 | 3/2003 |
| EP | 1921709 A1 | 5/2008 |
| EP | 2246934 A1 | 11/2010 |
| EP | 2463958 A1 | 6/2012 |
| EP | 2951884 A1 | 12/2015 |
| GB | 2535708 A | 8/2016 |
| WO | WO-2008082917 A2 | 7/2008 |
| WO | WO-2011148248 A2 | 12/2011 |
| WO | WO-2014118433 A1 | 8/2014 |
| WO | 2015054835 A1 | 4/2015 |
| WO | WO-2016007457 A1 | 1/2016 |
| WO | WO-2016089464 A1 | 6/2016 |
| WO | WO-2017004689 A1 | 1/2017 |

OTHER PUBLICATIONS

Extended European Search Report for related EP App No. 17883892.6 dated Jul. 15, 2020, 7 pgs.

* cited by examiner

RADIOVISION DEVICE

This application is the U.S. national stage of International Patent Application No. PCT/CL2017/050081, filed Dec. 21, 2017, which claims the benefit of Chilean Patent Application 3302-2016, filed Dec. 22, 2016.

SCOPE OF APPLICATION

The application scope of this device includes industrial applications for the rescue of people trapped in snow avalanches or collapsed buildings and the detection and measurement of electromagnetic emissions from electrical sources or mobile devices in places where their use is not permitted, such as prisons or airplanes. On the other hand, this invention concerns the detection and location of RF (Radio Frequency) sources within the cellular telephony spectrum and the real time overlay of a visual representation in the form of an image.

DESCRIPTION OF THE PRIOR ART

The prior art mentions makes reference to several patents that protect not a particular physical system, but a set of devices and methods that allow a particular type of operation.

There are a number of documents that lie within the general field of antennas, such as: EP 0 938 156, EP 0 144 867, US 2015/0022421, WO 2016/089464, WO 2011/148248.

On the other hand, there are a number of patents related to the scope of the present development, referenced below:

EP 0 887 879: This patent falls within the scope of this development and is intended to decrease the total size of a high-gain phased layout. This is achieved by using a multilayer structure where the phase shifters are coupled to the antennas, thereby eliminating the need to route to them. This device provides a new shape for the phase layout.

EP 1 921 709: This patent concerns a system capable of generating a double beam without grating lobes. It also underscores that it is a compact and complete module for beam synthesis.

U.S. Pat. No. 7,602,337 B2 (EP2100347): This patent concerns a layout in emitting phases, and the algorithms that control it. This device focuses its inventiveness on its shape, but also on its algorithms and software.

EP 2 463 958: This patent concerns a compact array of multibeam antennas that optimizes wireless connections within an closed space. The array is by itself the innovation, as it optimizes an old design called "Van-Atta".

U.S. Pat. No. 6,504,510, EP1294163, US2015/0022421: This patent concerns a phased layout for mobile telecommunications. The layout is arranged M×N, but only requires M+N phase shifters for its operation, since it also uses selective power dividers. This enables it to "take control of three beam paths" (moving the beam's azimuth and elevation).

U.S. Pat. No. 6,693,590 B1, EP1195017: This patent concerns a phased layout that uses ADCs to implement digital phase shifters. In order to do so, they use an IF-reducing conversion. The signal is then digitally combined. This is very inefficient for large bandwidths.

PCT/FI2014/050067, EP29511884: This patent relates to the integration of an array of antennas with existing telecommunications systems, minimizing resources (cabling) and size. It also optimizes the collection of "signal data".

WO 2008/082917: This patent concerns a series of methods and devices to optimize or improve the formation of the beam synthesized by a phased layout.

US 2009/0102716: This patent concerns a system with radar and telecommunications applications that uses a beam to deliver power and control data.

US 2009/0027267: This patent concerns a variable phase reflector. The idea is to illuminate the reflector with a horn antenna and change the direction of the beam through the reflector's phase control. The reflector is made up of an array of elements including, among others, varactors.

US 2016/0087349: This patent concerns a method for controlling beam width for a specific band and also for multi-band. The design uses a 4×4 prototype antenna where single and multiband antennas were placed in specific locations within the array.

US2008/0106467: This patent concerns a phased layout mounted completely on a multilayer substrate, with all the corresponding electronics placed at the rear. This is all compacted, and the size of the device is only limited by the size of the substrate. This system works in both directions.

US 2015/0316641: This patent corresponds to a transmitter for radars with multiple outputs, which can be controlled in-phase. This transmitter is integrated in a single chip. It also has an RF generator.

The closest device to the present development in the prior art is patent EP 2 246 934 A1. This patent lies within the technical scope of the present development and is capable of detecting and tracking the direction of package movements (movable objects) with active emissions by using an RFID tag on them. They use a 2×2 array, ensuring its compact size. Its application is focused on inventory management using RF tags. It requires an external computer to operate. The device and associated methods are protected.

Technical Problems Solved by the Present Invention

How to generate an integrated real-time image based on wavelengths of radio frequency and visible field, without excluding other fields, such as: near and far infrared, near and far ultraviolet.

How to generate a manual, self-supported and portable device that has the ability to generate the aforementioned images.

How to passively locate sources of radiation emission.

In order to be able to respond to the previous technical issues, in general, the present development includes:

The generation of a real-time RF image.
The use of Gaussian curve detection algorithms to locate the direction of the radiation sources.
The use of an optical video image to position the source of the radiation in the visual field by overlaying markers that identify the maximum radio radiation.
The set of devices and methods that allows for portable and autonomous operation.

General Description of the Invention

This patent concerns a compact and portable system for real-time detection and location of electromagnetic emissions in the spectrum used by mobile devices (cell phones and Wi-Fi/Bluetooth devices). The principle of detection and location is based on phased array technology, which enables the synthesis of a directional radiation beam that can be electrically controlled in terms of both its shape and direction, lacking any moving mechanical parts. These mechanisms are used primarily in military and astronomical applications. The device also includes localization and control algorithms. This device will allow detecting and locating electromagnetic emissions by scanning the antenna beam in a field of view of 80×80 degrees. Once detection and location are ready, the results are overlaid on a visual image captured by a video camera.

The device is completely passive, it does not emit electromagnetic radiation in the detection bands for its operation.

It should be understood that the present invention is not limited to the particular methodology, compounds, materials, manufacturing techniques, uses and applications described herein, as these may vary. It should also be understood that the terminology used herein is used for the sole purpose of describing a particular representation, and is not intended to limit the perspective and potential of the present invention.

It should be noted that the use and method, here, in the list of claims and throughout the entire text, that the singular does not exclude the plural, unless this is clearly implied in the context. So, for example, the reference to a "use or method" is a reference to one or more uses or methods and includes equivalents known by those who are knowledgeable in the subject (art). Similarly, as another example, the reference to "a step", "a stage" or "a mode" is a reference to one or so more steps, stages or modes and may include implicit and/or supervening sub-steps, stages or modes.

All the conjunctions used must be understood in their least restrictive and most inclusive sense possible. Thus, for example, the conjunction "or" must be understood in its logical orthodox sense, and not as an "or excluding", unless the context or text expressly needs or indicates it. The structures, materials and/or elements described are to be understood as also referring to those that are functionally equivalent in order to avoid endless, exhaustive lists.

The expressions used to indicate approximations or concepts should be understood as such, unless the context commands a different interpretation.

All names and technical and/or scientific terms used herein shall have the common meaning given by an ordinary person that is qualified in these matters, unless otherwise indicated.

Methods, techniques, elements, compounds and compositions are described although methods, techniques, compounds and compositions similar and/or equivalent to those described may be used or preferred in practice and/or testing of the present invention.

All patents and other publications are included as references, for the purpose of describing and/or informing, for example, the methodologies described in such publications, which may be useful in connection with this invention.

These publications are included solely because of their information prior to the registration date of the present patent application.

In this respect nothing should be considered as an admission or acceptance, rejection or exclusion, that the authors and/or inventors are not to be considered as such, or that such publications are pre-dated by others, or for any other reason.

In order to bring clarity to the present development, the following concepts shall be defined as follows:
Antennas: Elements capable of emitting or receiving electromagnetic radiation.
Directional radiation: An antenna does not always emit or receive in all directions. There are several types of antennas where it is possible to concentrate the radiated power in a privileged direction. The parameter for measuring this is known as the antenna gain.
Phased Array: An array of antennas spatially distributed over a plane. By shifting the amplitude and phase of each of the antennas, a direct radiation beam can be synthesized toward a specific direction.
High frequency electronics: Electrical elements that work in microwave frequency. These elements differ from conventional electronic elements because they are no longer treated as concentrated parameter elements, but as having distributed parameters, i.e. the position and distance between them affects their final behavior.
Radio frequency signal: A signal that has a frequency in the radio and microwave spectrum. The present development works on Gigahertz signals.
High-speed beam scanning: The scan performed by the phased array, which is performed on the entire scanning surface and where the radio frequency signal is captured. A general equivalent of this scan is the operation of cathode ray televisions.
Analog voltage signal: Continuous voltage signals that can take any value within its operating range. In digital signals, however, there are only two voltage levels to represent 0 and 1.
Microstrip antennas: A type of microwave antenna that can be mounted on a flat surface. These antennas are easily built and placed on a flat metal rectangle mounted on a ground surface separated by a layer of a dielectric material.

DETAILED DESCRIPTION OF THE INVENTION

The device corresponds to a detection and localization system that is based on the operating principle of the phased array technology. This technology allows for synthesizing a directional radiation beam through multiple non-directional radiating elements (antennas). This radiation beam is capable of receiving and emitting electromagnetic radiation. The width of the synthesized beam is defined by the separation that exists between the individual radiating elements. The beam direction can be changed by shifting the phase each of the individual elements. For a linear array of antennas, the phase shift between each of the adjacent elements of the array is given by Equation 1, where d is the distance between the elements, λ is the wavelength of the electromagnetic signal and $\theta_0$ is the angle in which the beam is rotated. The change in beam direction is shown in FIG. 10A and FIG. 10B.

$$\Delta\phi = \frac{2\pi}{\lambda} d \sin(\theta_0) \quad \text{Equation 1}$$

If the antennas are laid out in a two-dimensional array, without restricting other types of layouts, the beam direction can be controlled in two dimensions. The change in the beam direction will now be governed by two angles and its phase shift is given by the overlay on two axes.

This application can use a wide range of antenna arrays, without excluding any. A preferred range is 64 antennas to a minimum of 4 antennas, preferably 16 antennas. An array of 4 antennas allows for two-dimensional images. In general, the variation in the number of elements will affect the quality of the synthesized beam, a greater number of elements produce a decrease in the beam's lateral lobes and the separation between them affects said beam's width.

To perform the detection, the beam does a high-speed scan of the area. This allows creating an image of electromagnetic emissions, preferably in the range of mobile devices and Wifi (wireless fidelity), specifically in the 700-900 MHz, 1700-2100 MHz, 2400-2700 MHz and 5000 MHz bands, which are then overlaid with a digital visual image obtained through a video camera. The maximum field of vision intended for this invention is 90×90 degrees.

Given the nature of the technology and the uncertainty in the power intensity of the source to be detected and located, it is not possible to measure the distance from the emitted object, so the detection can only be performed instantaneously in two dimensions, which means that the detection is done on the 2D image in the XY plane, where Z is the depth. While it is possible to estimate the maximum distance from the source, an absolute distance measurement cannot be made.

The diagram shown in FIG. 2/10 shows the different components of the device, described below:

(1) Flat array of antennas: The array of antennas corresponds to a range between 64 and the 4 individual radiating elements. These elements have the ability to receive the electromagnetic emissions of all the bands to be detected (multi-band antennas, similar to cellular antennas). These elements are positioned in different shapes in order to improve the quality of the synthesized beam. A regular distribution of equidistant elements is preferred, such as a matrix shape, a circular shape, among others, as shown in FIG. 3/10. The array of antennas is compact enough to be part of a portable device.

(2) High frequency electronics: High frequency electronics are integrated into a series of PCBs (Printed Circuit Board). FIG. 4/10 shows the electronic elements included in the device.

Below is a list of each group of elements:

The phase shifters (3), whose number is equal to the antenna arrays, are connected to each of the radiating elements of the antenna arrays (1). They are responsible for changing the relative phase of the received electromagnetic waves.

The output of each of the phase shifters (3) is combined (14) in-phase to generate a single output with the information of the synthesized beam. The signal is then amplified analogously (11) with a low noise amplifier and is optionally filtered analogously with filters for that band (12), to reach a total power detector (4), which converts the radio frequency signal into a direct current (DC) signal. The latter is converted into a digital signal by means of an A/DC (5) (Digital Analog Converter).

The video camera (13) captures the optical image in which the detected source of electromagnetic radiation is shown. The camera is preferably a digital camera with a resolution higher than 640×480 pixels.

The video camera can be positioned higher than the antennas, it can be placed lower or placed at the center between the antennas, where, being in the same symmetry axis of the array of antennas simplifies the algorithm that overlays the radio image on the optical image.

(6) The microcomputer: fulfills a number of important tasks, the first one being the control and synchronization of the array (1), sending electrical signals to each of the phase shifters (3) and thus synthesizing the radiation beam in the desired direction. The microcomputer (6) is responsible for receiving and processing the signal coming from the detector (4), thereby constructing the RF image. This image is subsequently post processed to find the location of radio frequency emissions. The post-processing algorithm includes a Gaussian detector. The detections are then overlaid with the image from the video camera and displayed on the screen. The microcomputer (6) is also responsible for executing the program that provides the user interface.

(7) The power supply: allows the system to remain autonomous, energizing the radio frequency electronics, the camera and the microcomputer and its screen (8).

(9) System protection casing: the whole system is wrapped in a shell-like format that contains all the aforementioned components.

The aforementioned algorithm contains the following source code:

```
from rv.core import Core if __name__ == '__main__':

logging.basicConfig(filename='radiovision.log', format='%(asctime)s:%(levelname)s:%(message)s' ,level=logging.INFO, datefmt='%m/%d/%Y %I:%M:%S %p')

Core().stuff()

"""

This class initializae the GUI and controls the aqusition of frames

"""

class Core(object):

def __init__(self):

self.cam = camera.Camera().start()
```

```
# Load markers images
import os # this allows to lunch the project from any where
current_path = os.path.dirname(__file__) # and access the data
self.marker_1 = imread(current_path + '/markers/marker_1.png', -1)
self.marker_2 = imread(current_path + '/markers/marker_2.png', -1)
self.marker_3 = imread(current_path + '/markers/marker_3.png', -1)
self.markers = [self.marker_1, self.marker_2, self.marker_3]
# First frame
# imshow('RadioVision', self.cam.read())
# sync elements
# self.marker_position = Array('i',2*number_of_gaussians_to_fit)
self.marker_queue = JoinableQueue(1)
self.rf_scan_queue = JoinableQueue(10)
self.new_acc_len = Value('i',10)
self.rf_scan = rv.array.Array(31, 31, self.rf_scan_queue, self.new_acc_len)
self.marker_fit = rv.detection.detect.Detect(31, 31, self.marker_queue, self.rf_scan_queue)
# minimun amplitud value
self.amp_error =1e-6
# capture pictures loop
self.capture = True
self.video_thread = threading.Thread(target=self.start_all)
self.add_pip = False
# GUI Stuff
self._job = None
self.root = tkinter.Tk()
self.root.geometry("400x225")
self.root.protocol("WM_DELETE_WINDOW", self.on_closing)
self.button_frame = tkinter.Frame(self.root, width=100)
self.button_frame.pack_propagate(0)
self.button_frame.pack(fill='y', side=tkinter.LEFT)
self.video_frame = tkinter.Frame(self.root)
self.video_frame.pack(fill=tkinter.BOTH, side=tkinter.LEFT)
self.video_display = tkinter.Label(self.video_frame)#, height=225, width=300)
self.video_display.pack(fill=tkinter.BOTH, side=tkinter.LEFT)
self.button_pip = tkinter.Button(self.button_frame, text='PIP OFF', command=self.button_pip_action_on, height=3)
```

```python
        self.button_pip.pack(fill='x')
        self.button_acc_reset = tkinter.Button(self.button_frame, text='Reset ACC',height=3,command=self.reset_acc)
        self.button_acc_reset.pack(fill='x')
        tkinter.Label(self.button_frame,text="Acc Size").pack()
        self.acc_length = tkinter.Scale(self.button_frame, from_=1, to=100, orient=tkinter.HORIZONTAL, command=self.updateValue)
        self.acc_length.pack(fill='x')
        self.acc_length.set(10)
        self.root.bind("<<close_me>>",self.last_close)
        self.picture_scale_h_w = 640/480.0
        self.close_mutex = threading.Lock()
        self.close_cond = threading.Condition()
        self.main_loop_closed = False
    def get_picture_size(self):
        width_0 = self.root.winfo_width() - self.button_acc_reset.winfo_width()
        heigth_0 = width_0 / self.picture_scale_h_w
        heigth_1 = self.root.winfo_height()
        width_1 = heigth_1*self.picture_scale_h_w
        # print('s',width_0, heigth_0)
        # print('e',width_1, heigth_1)
        if heigth_0 <= heigth_1:
            return int(width_0), int(heigth_0)
        return int(width_1), int(heigth_1)
    def reset_acc(self):
        logging.debug('reset')
        self.rf_scan.new_acc()
    def updateValue(self, event):
        if self._job:
            self.root.after_cancel(self._job)
        self._job = self.root.after(500, self._do_something)
    def _do_something(self):
        self._job = None
        logging.debug("new value:" + str(self.acc_length.get()))
        self.new_acc_len.value = self.acc_length.get()
        self.rf_scan.new_acc_len()
    def button_pip_action_on(self):
```

```
self.add_pip = True self.button_pip.configure(text='PIP ON')

self.button_pip.configure(command=self.button_pip_action_off)

def button_pip_action_off(self):

self.add_pip = False self.button_pip.configure(text='PIP OFF')

self.button_pip.configure(command=self.button_pip_action_on)

def on_closing(self):

self.capture = False def stuff(self):

self.video_thread.start()

self.root.mainloop()

def start_all(self):

start array data and fit self.rf_scan.start()

self.marker_fit.activate_plot()

self.marker_fit.start()

the rest of the programm initial values for the positions of the markers markers_coords = None update_counter = 0 display_color_map = None import cv2 picture_wide = 300 picture_heigth = int(picture_wide * self.picture_scale_h_w)

time.sleep(1)

while self.capture:

frame = self.cam.read()

draw a rectangle over the image drawrect(frame, (100, 20), (540, 460), (0, 0, 0), 3, style='else')

drawrect(frame, (100, 20), (540, 460), (0, 255, 255), 1, style='else')

if queue has task while not self.marker_queue.empty():

[markers, data] = numpy.array( self.marker_queue.get())

self.marker_queue.task_done()
```

```
        # extend the data
        y = numpy.arange(0, 31, 1)
        x = numpy.arange(0, 31, 1)
        f = interpolate.interp2d(x, y, data, kind='cubic')
        display_color_map = f(numpy.arange(0, 30, 0.3),numpy.arange(0, 30, 0.3))
        # Update markers
        markers_coords = stretch_coords(markers, self.markers)
      if markers_coords is not None and len(markers_coords) > 0:
          self.paint_markers(frame, markers_coords ,markers[2])
      if display_color_map is not None and self.add_pip:
          frame = self.add_picture_in_picture(frame, display_color_map)
      frame_aux = imutils.resize(frame, width=picture_wide, height=picture_heigth)
      picture_wide,picture_heigth = self.get_picture_size()
      image = cv2.cvtColor(frame_aux, cv2.COLOR_BGR2RGB)

image = Image.fromarray(image)
      try:
          image = ImageTk.PhotoImage(image)
      except RuntimeError as e:
          break
      self.video_display.configure(image=image)
      self.video_display.image = image
      # if update_counter > 1000:
      #     print('none')
      #     markers_coords = None
      #     update_counter = 0
      #     display_color_map = None
      # update_counter += 1
    logging.info('core closing')
    self.closing()
def add_picture_in_picture(self, frame, data):
    # convert the data to uint scale from 0 to 255
    # as if it was a gray scale image
    max_value = numpy.max(data)
    data /= max_value
```

```
# this is have a better distribution of colors
data *= 255
data = data.astype(numpy.uint8)
# generate the color image
# it must be uint8 data type to work
data_colormap = cv2.applyColorMap(data, cv2.COLORMAP_JET)
[frame_x, frame_y, a] = frame.shape
[pip_x, pip_y, a] = data_colormap.shape
frame[frame_x - pip_x:frame_x,frame_y-pip_y:frame_y,:] = data_colormap
return frame
def closing(self):
    logging.info('Closing objects...')
    self.cam.stop()
    self.rf_scan.shutdown()
    self.marker_fit.shutdown()
    time.sleep(5)
    while self.cam.thread_update.isAlive():
        pass
    self.root.event_generate("<<close_me>>", when="tail")
    logging.info('** Camera Closed **')
def last_close(self, *args):
    self.root.destroy()
def paint_markers(self, frame, marker_cords, markers_amp):
    # print('detected amplitudes: ', markers_amp)
    max_amp = max(markers_amp)
    max_amplitud_ration = 0.1
    font = cv2.FONT_HERSHEY_PLAIN
    constante= 1.0
    distance_funtion = lambda power: str(power) + 'APU'
    draw_distance = lambda _amplitud, Mx, My: cv2.putText(frame, distance_funtion(_amplitud), (Mx, My), font, 1, (0, 255, 255), 1)
    draw_distance_back = lambda _amplitud, Mx, My: cv2.putText(frame, distance_funtion(_amplitud), (Mx, My), font, 1, (0, 0, 0), 2)
    ampl_cont = 0
    for M1y,M1x in marker_cords:
        for c in range(0, 3):
```

```python
        # paint the markers
        if markers_amp[0] < max_amplitud_ration*max_amp:
            pass
        else:
            try:
                frame[M1y:M1y + self.markers[2].shape[0], M1x:M1x + self.markers[2].shape[1], c] = \
                    self.markers[2][:, :, c] * (self.markers[2][:, :, 3] / 255.0) + frame[M1y:M1y + self.markers[2].shape[0],
                    M1x:M1x + self.markers[2].shape[1], c] * (1.0 - self.markers[2][:, :, 3] / 255.0)
 draw_distance_back(markers_amp[ampl_cont],M1x,int(M1y+self.markers[2].shape[0]/3))
 draw_distance(markers_amp[ampl_cont],M1x,int(M1y+self.markers[2].shape[0]/3))
            except Exception as e:
                pass #print('marker 1 error' + str(e))
        ampl_cont += 1
class Camera:
    def __init__(self, src=0):
        # USB camera handler
        self.stream = cv2.VideoCapture(src)  # Don't leave VideoCapture argument empty
        self.grabbed, self.frame = self.stream.read()  # Read first frame
        # Data flow control variables
        self.stopped = False
        # Thread handler
        self.thread_update = threading.Thread(target=self.update, args=())
        # self.thread_display = threading.Thread(target=self.display, args=())  # Commented due to weird behavior
    def start(self):
        self.thread_update.start()
        # self.thread_display.start()
        return self
    def update(self):
        while self.stream.isOpened():
            if self.stopped:
                return
            self.grabbed, self.frame = self.stream.read()
        self.stream.release()
    def display(self):  # Currently not in use
        cv2.imshow('RadioVision', self.frame)
        while True:
```

```python
        if self.stopped:
            return
        cv2.imshow('RadioVision', self.frame)
    def read(self):
        return self.frame
    def stop(self):
        self.stopped = True
class Array(Process):
    def __init__(self, size_x,size_y, queue, acc_len):
        super(Array, self).__init__()
        x = numpy.linspace(0, size_x-1, size_x)
        y = numpy.linspace(0, size_y-1, size_y)
        self.domain = numpy.meshgrid(x, y)
        self.Power = [] # the vector version of the measuremente
        self.Z = [] # the matrix version of the measuremente
        # sincronize elements
        self.queue = queue # pass the markers to the other process
        self.stop_event = Event()
        self.new_acc_event = Event()
        self.new_acc_len_event = Event()
        self.MY_SOCK_PATH = "/home/pi/comunication"
        self.sock = socket.socket(socket.AF_UNIX, socket.SOCK_STREAM)
        self.max_hold = numpy.zeros((size_x,size_y))
        self.number_acc = 10
        self.current_acc = 0
        self.new_acc_index = 0
        self.acc_len = acc_len
        self.max_hold = numpy.zeros((self.number_acc, size_x, size_y))
        try:
            self.sock.connect(self.MY_SOCK_PATH )
        except socket.error as msg:
            sys.stderr.write("bad conection")
            # sys.exit(1)
    def change_acc_length(self, new_acc_length):
        if new_acc_length > 0:
```

```python
        self.number_acc = new_acc_length
    def reset_acc(self):
        a,b,c = self.max_hold.shape
        self.max_hold = numpy.zeros((self.number_acc, b, c))
        self.new_acc_event.clear()
    def change_acc_len(self):
        # print(self.max_hold.shape, self.new_acc_index)
        length, b, c = self.max_hold.shape
        new_a = self.acc_len.value
        new_max_hold = numpy.zeros((new_a, b, c))
        if self.number_acc >= new_a:
            back_index = self.new_acc_index - new_a
            if back_index < 0:
                tmp = back_index
                back_index = 0
                new_max_hold[0:abs(tmp),:,:] = self.max_hold[length + tmp:length,:,:]
                new_max_hold[abs(tmp):new_a,:,:] = self.max_hold[back_index:self.new_acc_index,:,:]
            else:
                new_max_hold[0:new_a, :, :] = self.max_hold[back_index:self.new_acc_index, :, :]
            self.new_acc_index = 0
        else:
            new_max_hold[0:(length - self.new_acc_index),:,:] = self.max_hold[self.new_acc_index:length,:,:]
            new_max_hold[(length - self.new_acc_index):length, :, :] = self.max_hold[0:self.new_acc_index, :, :]
            self.new_acc_index = length
        self.max_hold = new_max_hold.copy()
        self.number_acc = new_a
        # print(self.max_hold.shape)
        # print(self.new_acc_index)
        self.new_acc_len_event.clear()
    def get_scann(self):
        self.sock.sendall(b'scann\n')
        n = 0
        recieve_data = b''
        while n < 31*31*8:
            recieve_data_aux = self.sock.recv(31*31*8)
```

```python
        recieve_data += recieve_data_aux
        n += len(recieve_data_aux)
    recieve_data = unpack('<' + str(31*31) + 'd', recieve_data)
    recieve_data = array(recieve_data)
    return numpy.reshape(recieve_data,(31,31))
def sweep_once(self):
    self.logging_info( 'New measure...')
    t = time.time()
    magnitudeMat = self.get_scann()
    tf = time.time()
    self.logging_info('Elapsed : ' + str(tf - t) + ' seconds')
    # magnitudeMat = 10**(magnitudeMat/10.0)
    self.max_hold[self.new_acc_index,:,:] = magnitudeMat
    self.new_acc_index = (self.new_acc_index + 1) % self.number_acc
    self.current_acc += 1
    self.Power = numpy.max(self.max_hold, axis=0)
def shutdown(self):
    self.stop_event.set()
def new_acc(self):
    self.new_acc_event.set()
def new_acc_len(self):
    self.new_acc_len_event.set()
def logging_info(self, msg):
    logging.info('[Array] ' + msg)
def run(self):
    self.logging_info('Start array.')
    while 1:
        if self.stop_event.is_set():
            self.logging_info('Stopping array.')
            return
        # do one scann
        if self.new_acc_event.is_set():
            self.reset_acc()
        if self.new_acc_len_event.is_set():
            self.change_acc_len()
```

```
        self.sweep_once()

try:

pass the scan to fit gaussians self.queue.put(self.Power,block=True,timeout=0.5)

except Full:

the queue is full self.logging_info('Scan drop.')
def drawline(img, pt1, pt2, color, thickness=1, style='dotted', gap=20):

dist = ((pt1[0] - pt2[0])  2 + (pt1[1] - pt2[1])  2) ** .5 pts = []

for i in np.arange(0, dist, gap):

r = i / dist x = int((pt1[0] * (1 - r) + pt2[0] * r) + .5)

y = int((pt1[1] * (1 - r) + pt2[1] * r) + .5)

p = (x, y)

pts.append(p)

if style == 'dotted':

for p in pts:

cv2.circle(img, p, thickness, color, -1)

else:

e = pts[0]

i = 0 for p in pts:

s = e e = p if i % 2 == 1:

cv2.line(img, s, e, color, thickness)

i += 1
def drawpoly(img, pts, color, thickness=1, style='dotted', ):

e = pts[0]

pts.append(pts.pop(0))

for p in pts:

s = e e = p drawline(img, s, e, color, thickness, style)
```

```python
def drawrect(img, pt1, pt2, color, thickness=1, style='dotted'):
    pts = [pt1, (pt2[0], pt1[1]), pt2, (pt1[0], pt2[1])]
    drawpoly(img, pts, color, thickness, style)

def stretch_coords(fitted_coords, punteros):
    """ This functions handles the coordinate
    transmfrmation to fit the image"""
    new_coordinates = []
    # return new_coordinates
    # px = [-0.00000970378811294236, 0.00208172113150949, -0.153201441654720, 8.43103861597864, 118.848944819314]
    # py = [-0.0000442788139443627, 0.00320074167604714, 0.104246823935828, -6.04649560143571, 199.899107062199]
    # ypix[0] = np.polyval(py, fitted_coords[1][0]*3)
    # ypix[1] = np.polyval(py, fitted_coords[1][1]*3)
    # ypix[2] = np.polyval(py, fitted_coords[1][2]*3)
    # xpix[0] = np.polyval(px, fitted_coords[0][0]*3)
    # xpix[1] = np.polyval(px, fitted_coords[0][1]*3)
    # xpix[2] = np.polyval(px, fitted_coords[0][2]*3)
    x_offset = 20
    x_scale_factor = int(440/31)
    y_offset = 100
    y_scale_factor = int(440 / 31)
    puntero1 = punteros[0]
    for cont in range(len(fitted_coords[0])):
        xp = int(fitted_coords[0][cont] * x_scale_factor + x_offset)
        xp -= int(puntero1.shape[0] / 2)
        yp = int(fitted_coords[1][cont] * y_scale_factor + y_offset)
        yp -=int(puntero1.shape[1] / 2)
        new_coordinates.append((xp,yp))
    return new_coordinates class DetectGaussias(object):
    def __init__(self, number_sample_points=150, alfa = 0.05):
        """This class detects an unknow number of gaussians.
        Keyword arguments:
        number_sample_points -- number of samplings to get form the data (default 200)
        """
        self.sample_data = ResampleData()
```

```
self.get_covar_mean = EstimateMeanCovariance(alfa)

self.number_sample_points = number_sample_points self.density_threshold = 0.6 # 0.05and aporiximation considering 20 points in a circunsfere wiht a radius of 20 with no pi self.minimum_area = 7 self.alfa = alfa def sample_from_data(self, data):

sample_index = numpy.zeros([self.number_sample_points, 2])

for cont in range(self.number_sample_points):

indy, indx = self.sample_data.sample_data(data)

sample_index[cont, 0] = indy sample_index[cont, 1] = indx cont += 1 if cont == self.number_sample_points:

break return sample_index def get_bic(self, cluster, means=[], covars=[]):

""" This functions calculates the bayesian informatio criterion for a set of set of points cluster -- set of points

"""

(d,) = cluster[0].shape mean = numpy.zeros((d,))

total = 0 for cluster in clusters:

for point in cluster:

mean += point total += 1 mean /= total covar = numpy.zeros([d,d])

for cluster in clusters:

for point in cluster:

val = point - mean covar += numpy.dot(val[None,:].T,val[None,:])

covar /= total u,s,v = numpy.linalg.svd(covar)
```

```
area = 1 chi_square_alfa = chi2._ppf(1 - 0.05, 2)

for cont in range(d):

area *= s[cont] * chi_square_alfa area = sqrt(area)

print(area, 'area')

density = total / area print(density, 'density')

if density >= self.density_threshold:

means.append(mean)

covars.append(covar)

return True return False def detect_number_of_clusters(self, data_set):#, m_near = 18):

""" this functiona applays a preprocessing of the data to try to estimate the number of clusters available.

Keyword arguments:

data_set -- a two dimentional array that contains the coordinates of the clusters m_near -- the number of neiborhood that are considered to rank the ponts (default 15)

alfa -- the confidence interval, (1 - alfa) * 100 % (default 0.05)

"""

alfa = self.alfa reamaining_points = data_set.copy()

detected_clusters = []

cont_fig = 3 plot_all = False m_near = 10 while 1:

points_size, dimention = reamaining_points.shape real_near = m_near if m_near < points_size else points_size - 1 near_distance = numpy.ones([points_size, real_near]) * 100 near_distance_index = numpy.zeros([points_size, real_near])

if real_near < 2:

logging.warning('posible_problem')

# Estimate the ranks from the points
```

```
cont_main = 0 for y_p, x_p in reamaining_points:

cont_aux = 0 for y_aux, x_aux in reamaining_points:

print(cont_aux)

if cont_main == cont_aux:

cont_aux += 1 continue distance = sqrt((y_p - y_aux)  2 + (x_p - x_aux)  2)

for cont in range(int(real_near)):

if near_distance[cont_main, cont] > distance:

if cont != real_near - 1:

print('in_me')

near_distance[cont_main, cont + 1:real_near] = near_distance[cont_main, cont:real_near - 1]

near_distance_index[cont_main, cont + 1:real_near] = near_distance_index[cont_main, cont:real_near - 1]

else :

print('to long')

near_distance[cont_main, cont] = distance near_distance_index[cont_main, cont] = cont_aux break cont_aux += 1 cont_main += 1 ranks = numpy.sum(near_distance, axis=1)

weights = 1 / ranks weights /= numpy.sum(weights)

uniform_dist_value = 1 / (1.0 * weights.size)

sample one point to star the cluster detection x_i = self.sample_data.sample_data_gen_1d(weights, uniform_dist_value)

total = numpy.sum(data_set)

dist_data = data_set / total add the point itself index_to_consider = numpy.concatenate([ near_distance_index[x_i], numpy.array([x_i,])])

covar, mean = self.get_covar_mean.estimate_mean_variance(reamaining_points, index_to_consider)

new_cluster_points_index = []

chi_p_alpha = chi2._ppf(1 - alfa, 2)
```

```
        alfa_confidence_covar = chi_p_alpha * covar
        for cont in range(points_size):
            choosen_point = reamaining_points[cont, :].copy()
            choosen_point -= mean
            # check if point is inside hyper-cube
            points_ = choosen_point[:,None]
            evalueate_ellipsoid = numpy.dot(numpy.dot(points_.T, numpy.linalg.inv(alfa_confidence_covar)), points_)
            if evalueate_ellipsoid <= 1:
                new_cluster_points_index.append(cont)
        # remove the points from the cluster
        # invert array to avoid having problems with the change in size and
        # new indexing of the array
        new_cluster_points_index.sort(reverse=True)
        new_cluster_points = []
        for index in new_cluster_points_index:
            # delete one point at a time
            new_cluster_points.append(reamaining_points[index, :])
            reamaining_points = numpy.concatenate((reamaining_points[0:index, :], reamaining_points[index+1:, :]))
        points_size, dimention = reamaining_points.shape
        # self.plot_points(reamaining_points, new_cluster_points, cont_fig)
        cont_fig += 1
        detected_clusters.append(new_cluster_points)
        # if the are enought point do one more iteration
        # print(points_size)
        if points_size <= m_near :
            break
    cluster_amount = 0
    means = []
    covars = []
    for cont in range(len(detected_clusters)):#range(len(detected_clusters), 1, -1):
        if self.get_bic(detected_clusters[cont], means, covars):
            cluster_amount += 1
            # print('yes')
    return self.fusse_near_clusters(means, covars)
def make_markers(self, mean, data):
```

```python
        markers = [[],[],[]]
        for x,y in mean:
            markers[0].append(x)
            markers[1].append(y)
            markers[2].append(data[int(x),int(y)])
        return markers def plot_points(self, sample_index, delated, cont):
        points = numpy.zeros((31, 31))
        for indy, indx in sample_index:
            points[int(indy), int(indx)] = 1
        for indy, indx in delated:
            points[int(indy), int(indx)] = 0.5
        pyplot.figure(cont)
        pyplot.cla()
        pyplot.clf()
        pyplot.imshow(points)
        pyplot.draw()
        # pyplot.show(block=False)

def fusse_near_clusters(self, means, covars):
        NN = len(means)
        mm = means.copy()
        meged = []
        final_means = []
        # print('in')
        cont = 0
        while cont < NN:
            if cont in meged:
                cont += 1
                continue
            # print('first thing, mean')
            # print(means[cont])
            merge_count = 1
            mean = means[cont].copy()
            for cont1 in range(cont + 1,NN):
                if cont1 in meged:
```

```python
            continue
        covar_sum = covars[cont] + covars[cont1]
        distance = means[cont] - means[cont1]
        distance = numpy.dot(distance[:,None].T,distance[:,None])
        sum_distribution = multivariate_normal(means[cont], covar_sum)
        evala = sum_distribution.pdf(means[cont1])
        # print('gaussian dist',evala)
        # print(means[cont1])
        #
        # print('distance', distance)
        if distance <= 40:
            # print('merge')
            mean += means[cont].copy()
            merge_count += 1
            meged.append(cont1)
        final_means.append(mean/merge_count)
        cont += 1
    # print('out')
    return final_means
class Detect(Process):
    def __init__(self, size_x, size_y, queue_markers, queue_scan, number_of_gauss=3):
        super(Detect, self).__init__()
        # Data & Domain arrays needed for performing the fit
        self.domain = meshgrid(linspace(0, size_x-1, size_x), linspace(0, size_y-1, size_y))
        self.data = zeros((size_x*size_y, 0))
        # Outputs
        self.markers = [zeros((number_of_gauss, 1)), zeros((number_of_gauss, 1)), zeros((number_of_gauss, 1))]
        self.time_elapsed = 0.
        self.queue_scan = queue_scan
        self.queue_markers = queue_markers
        self.stop_event = Event()
        self.display_rf_scan = False
    def activate_plot(self):
        self.display_rf_scan = True
    def deactivate_plot(self):
```

```
    self.display_rf_scan = False
# def fit(self, data):
#     it = time.time()
#     # print('fit')
#     [x1, x2, x3, y1, y2, y3, a1, a2, a3, s1, s2, s3] = Fit(data, self.domain)
#     tf = time.time()

#     Amps = array([a1, a2, a3])

#     Xpos = array([(x1), (x2), (x3)])
#     Ypos = array([(y1), (y2), (y3)])
#     orden = Amps.argsort()

#     self.markers[0] = [Xpos[orden[2]], Xpos[orden[1]], Xpos[orden[0]]]
#     self.markers[1] = [Ypos[orden[2]], Ypos[orden[1]], Ypos[orden[0]]]
#     self.markers[2] = [Amps[orden[2]], Amps[orden[1]], Amps[orden[0]]]

#     self.time_elapsed = tf - it

#     return self.markers.copy()
def log_function_info(self, msg):
    logging.info('[Detect] ' + msg)
def run(self):
    self.log_function_info('Start detect.')
    from matplotlib import use
    use('TkAgg')
    from matplotlib import pyplot
    pyplot.ion()
    detect = DetectGaussias()
    while 1:
        if self.stop_event.is_set():
            self.log_function_info('Stopping detect.')
            return
        data = self.queue_scan.get()
        self.queue_scan.task_done()
```

```python
self.log_function_info( 'Data recieve.')
# the medum filter needs
mask = data
mask = mask.astype(numpy.float32)
data = cv2.medianBlur(mask, 5)# * numpy.max(data) /255.0/256
# add watershed
watershed_data = data / numpy.max(data) * 255
watershed_data = watershed_data.astype(numpy.uint8)
ret, thresh = cv2.threshold(watershed_data, 0, 255, cv2.THRESH_BINARY_INV + cv2.THRESH_OTSU)
index_0 = (thresh == 0)
index_255 = (thresh == 255)
mask[index_0] = 255
mask[index_255] = 0
# data[index_0] = 255
# data[index_255] = 0
# end watershed
resampling = detect.sample_from_data(data)
means = detect.detect_number_of_clusters(resampling)
markers = detect.make_markers(means, data)
if len(markers[2]) > 0:
    max_amplitud = max(markers[2]) * 1.2
    max_index = mask > max_amplitud
    mask[max_index] = max_amplitud
    self.log_function_info( 'Markers ready.')
try:
    self.queue_markers.put([markers, data],block=True,timeout=0.5)
except:
    self.log_function_info('Markers drop.')
if self.display_rf_scan:
    fig = pyplot.figure(42)
    ax = fig.add_subplot(1, 1, 1)
    pyplot.cla()
    circ1 = pyplot.Circle((markers[0][0], markers[1][0]), 2.0, color="white")
    circ2 = pyplot.Circle((markers[0][1], markers[1][1]), 1.0, color="white")
    circ3 = pyplot.Circle((markers[0][2], markers[1][2]), 0.5, color="white")
```

```
        pyplot.imshow(data)

ax.add_patch(circ1)

ax.add_patch(circ2)

ax.add_patch(circ3)

pyplot.draw()

pyplot.show()

pyplot.pause(0.1)

def shutdown(self):

self.stop_event.set()

def posiciones(minima, maxima):

x1 = 0 x2 = 0 x3 = 0 y1 = 0 y2 = 0 y3 = 0 dist1 = 0 dist2 = 0 dist3 = 0 while dist1 < minima or dist2 < minima or dist3 < minima or dist3 > maxima or dist1 > maxima or dist2 > maxima:

x1 = randint(0, 89)

x2 = randint(0, 89)

x3 = randint(0, 89)

y1 = randint(0, 89)

y2 = randint(0, 89)

y3 = randint(0, 89)

dist1 = math.sqrt((x1-x2)**2+(y1-y2)**2)

dist2 = math.sqrt((x3-x2)**2+(y3-y2)**2)

dist3 = math.sqrt((x1-x3)**2+(y1-y3)**2)

return x1, y1, x2, y2, x3, y3 def maxarg(data):

Busca maximos y su posicion en los datos x = 0 y = 0 maxi = 0.
```

```
    i = 0 j = 0 aux = data.reshape(90, 90)

while i < 89:

while j < 89:

if aux[i][j] > maxi:

x = i y = j maxi = aux[i][j]

j += 1 j = 0 i += 1 return maxi, y, x   # data.reshape seems to flip axis def arg_sort(values):

index = list(range(len(values)))

for cont in range(len(values)-1):

change = False for cont1 in range(len(values)-1):

if values[cont1] < values[cont1+1]:

tmp = values[cont1]

values[cont1] = values[cont1+1]

values[cont1 + 1] = tmp tmp = index[cont1]

index[cont1] = index[cont1 + 1]

index[cont1 + 1] = tmp change = True if not change:

break return index class EstimateMeanCovariance(object):

def __init__(self, alfa = 0.05):

self.alfa = alfa def get_lambda_2(self, lambda_t, lambda_s, radio):

err = 1e-2 lambda_s1 = 0
```

```
lambda_s0 = lambda_t * 0.1 try:

cont = 0 while 1:

ratio = radio/sqrt(lambda_s0)

upper = (ratio*norm.pdf(ratio))

lower = norm.cdf(ratio) - 0.5 lambda_s1 = lambda_t /(1 - upper/lower )

if lambda_s1 < 0 or lambda_s1 > 1e5:

print('reset')

lambda_s1 = lambda_t * 0.1 radio = radio * 1.5 if abs(lambda_s0 -lambda_s1) < err:

return lambda_s1 lambda_s0 = lambda_s1 cont += 1 if (cont % 1000) == 999:

print('*',)

print('end')

except Exception as e:

raise e def estimate_mean_covar_u_s_v(self, data, dimention, points_index):

x_center = numpy.zeros((dimention,))

covar_matrix = numpy.zeros((dimention, dimention,))

for index_p in points_index:

print(data[index_p, :])

x_center += data[int(index_p), :]

initial mean estimation x_center /= len(points_index)

for index_p in points_index:

x_i = x_center - data[int(index_p), :]

x_i = x_i[:, None]

covar_matrix += numpy.dot(x_i, x_i.T)

initial estimation covar matrix covar_matrix /= len(points_index)
```

```
    U, s, V = numpy.linalg.svd(covar_matrix)
    s = numpy.diag(s)
    return x_center, covar_matrix, U, s, V
def estimate_mean_variance(self, data, initial_points_index):
    points_size, dimention = data.shape
    x_center, covar_matrix, U, s, V = self.estimate_mean_covar_u_s_v(data, dimention, initial_points_index)
    radio = 0
    # print('start mean estimation')/
    for cont in initial_points_index:
        aux = data[int(cont)] - x_center
        r = sqrt(numpy.dot(aux[:, None].T, aux[:, None]))
        if radio < r:
            radio = r
    # initial estimation lambda square
    lambda_0 = numpy.ones((dimention,))*radio
    sqrt_chi_p_alpha = sqrt(chi2._ppf(1-self.alfa,2))
    for cont in range(dimention):
        lambda_0[cont] /= sqrt_chi_p_alpha
    # calculate initial hyperrectanble axes
    hyper_rectangle_thing = numpy.zeros((dimention, dimention,))
    previus_covariance = covar_matrix.copy()
    prev_error = 0
    for watch_dog in range(150):
        for cont in range(dimention):
            hyper_rectangle_thing[cont, :] = sqrt_chi_p_alpha * lambda_0[cont]*U[cont,:]
        points_in = []
        # get the points that are inside the hyper rectangle
        for cont in range(points_size):
            choosen_point = data[cont, :].copy()
            choosen_point -= x_center
            # check if point is inside hyper-cube
            is_in = True
            for cont1 in range(dimention):
                # print(cont,cont1,'a')
                vector_magnitud = sqrt(numpy.dot(hyper_rectangle_thing[cont1, :].T,hyper_rectangle_thing[cont1, :]))
```

```
        unitar_vector = hyper_rectangle_thing[cont1, :]/vector_magnitud projection = numpy.dot(choosen_point, unitar_vector)

if not (projection <= vector_magnitud and projection >= -vector_magnitud):

is_in = False break if is_in:

points_in.append(cont)

read the documentation on numpy linalg svd x_center, covar_matrix, U, s, V = self.estimate_mean_covar_u_s_v(data, dimention, points_in)

estimate the values of the norma distribution usin a truncated distribution , see result 2.2 and 2.1 radio_ = numpy.zeros((dimention,))

for cont in range(dimention):

radio_aux = hyper_rectangle_thing[cont,:]

radio_[cont] = sqrt(numpy.dot(radio_aux,radio_aux))

o,ss,oo = numpy.linalg.svd(previus_covariance)

for cont in range(dimention):

if isnan(s[cont,cont]):

logging.ERROR('NaN')

if s[cont, cont] == 0:

logging.ERROR('by zero')

lambda_2 = self.get_lambda_2(s[cont,cont], ss[cont],radio_[cont])

s[cont,cont] = (lambda_2)

estimate the region of 1-alfa confidence radio_constant = chi2._ppf(1 - self.alfa, 2) / dimention se the points that are inside this last region region_b = []

A_matrix = numpy.dot(numpy.dot(U, s * radio_constant), V.T)

for cont in range(points_size):

choosen_point = data[cont, :].copy()

choosen_point -= x_center check if point is inside hyper-cube is_in = True points_ = choosen_point[:,None]

evalueate_ellipsoid = numpy.dot(numpy.dot(points_.T, numpy.linalg.inv(A_matrix)), points_)
```

```
            if evalueate_ellipsoid <= 1:

region_b.append(cont)

x_center, covar_matrix, U, s, V = self.estimate_mean_covar_u_s_v(data, dimention, region_b)

error = numpy.sum(numpy.abs(covar_matrix - previus_covariance))

if error < 0.1:

break if abs(error - prev_error) < 1e-6:

break prev_error = error

U, s, V = numpy.linalg.svd(covar_matrix)

for cont in range(dimention):

lambda_0[cont] = sqrt(s[cont])

previus_covariance = covar_matrix.copy()

print('end  mean estimation')

return covar_matrix, x_center class ResampleData(object):

def interpol_data(self, data, y_index, x_index):

lower_x = int(x_index)

lower_y = int(y_index)

upper_x = int(x_index + 1)

upper_y = int(y_index + 1)

value = data[upper_y, upper_x]*sqrt((y_index - upper_y)**2 + (x_index - upper_x)**2)

value += data[lower_y, lower_x]*sqrt((y_index - lower_y)**2 + (x_index - lower_x)**2)

value /= sqrt((upper_y - lower_y)**2 + (upper_x - lower_x)**2)

return value def sample_data(self, data):

return self.sample_data_gen(data, 0.005)

def sample_data_gen(self, data, dist_val, size_x = 30, size_y =30):

maximum = dist_val total = numpy.sum(data)

sample_data_ = data/total while 1:

[idx_x, idx_y] = [self.float_random(size_x),self.float_random(size_y)]

offset = self.float_random(maximum)

if offset <= self.interpol_data(sample_data_,idx_y,idx_x):
```

```
        return idx_y,idx_x def sample_data_gen_1d(self, data, dist_val):

while 1:

idx_y = random_integers(0, data.size - 1)

offset = self.float_random(dist_val)

try:

if offset <= data[idx_y]:

return idx_y except:

logging.ERROR(data.shape,'fail to sample',data.size)

return 0 def float_random(self, ends):

return random()*ends

ADS_CONV_REG  = 0x00

ADS_CONF_REG  = 0x01

ADS_LTHR_REG  = 0x02

ADS_HTHR_REG  = 0x03

ADS_ADDR_GND  = 0x90

ADS_ADDR_VDD  = 0x92

ADS_ADDR_SDA  = 0x94

ADS_ADDR_SCL  = 0x96

ADS_READ  = 0x01

ADS_WRITE  = 0x00

ADS_OS  = 0x8000

ADS_CONV_CURR  = 0x0000

ADS_CONV_NCURR  = 0x8000

ADS_NOFX  = 0x0000

ADS_CONV_BEGIN  = 0x8000

ADS_MUX  = 0x7000

ADS_AIN0_AIN1  = 0x0000

ADS_AIN0_AIN3  = 0x1000

ADS_AIN1_AIN3  = 0x2000

ADS_AIN2_AIN3  = 0x3000

ADS_AIN0_GND  = 0x4000

ADS_AIN1_GND  = 0x5000
```

ADS_AIN2_GND = 0x6000

ADS_AIN3_GND = 0x7000

ADS_PGA = 0x0E00

ADS_6144 = 0x0000

ADS_4096 = 0x0200

ADS_2048 = 0x0400

ADS_1024 = 0x0600

ADS_0512 = 0x0800

ADS_0256 = 0x0A00

ADS_MODE = 0x0100

ADS_CONT_CONV = 0x0000

ADS_SING_CONV = 0x0100

ADS_DATA_RATE = 0xE0

ADS_8SPS = 0x00

ADS_16SPS = 0x20

ADS_32SPS = 0x40

ADS_64SPS = 0x60

ADS_128SPS = 0x80

ADS_250SPS = 0xA0

ADS_475SPS = 0xC0

ADS_860SPS = 0xE0

ADS_COMP_MODE = 0x10

ADS_COMP_TRAD = 0x00

ADS_COMP_WIND = 0x10

ADS_COMP_POL = 0x08

ADS_COMP_LOW = 0x00

ADS_COMP_HIGH = 0x08

ADS_COMP_LAT = 0x04

ADS_COMP_NLATCH = 0x00

ADS_COMP_LATCH = 0x04

ADS_COMP_QUE = 0x03

ADS_COMP_ONEC = 0x00

ADS_COMP_TWOC = 0x01

ADS_COMP_FOURC = 0x02

ADS_COMP_DISABLE = 0x03

```c
// Codigo en C, implementacion del servidor local
/* A simple server in the internet domain using TCP
   The port number is passed as an argument */
#include <stdio.h>
#include <stdlib.h>
#include <stdint.h>
#include <string.h>
#include <fcntl.h>
#include <unistd.h>
#include <sys/types.h>
#include <sys/socket.h>
#include <sys/mman.h>
#include <sys/stat.h>
#include <sys/un.h>
#include <netinet/in.h>
#include <unistd.h>
#include <math.h>
#include <wiringPiI2C.h>
#include "cnpy.h"
#include "ADS1115.h"
#include <iostream>
#include <time.h>
/*socket related define*/
#define MY_SOCK_PATH "/home/pi/comunication"
#define LISTEN_BACKLOG 50
#define handle_error(msg) do { perror(msg); exit(EXIT_FAILURE); } while (0)
/*scann related define*/
#define PAGE_SIZE (4*1024)
#define BLOCK_SIZE (4*1024)
#define SIZE_N 31
#define MIN_ANG -30
#define MAX_ANG 30
#define STEP_ANG (MAX_ANG-MIN_ANG)/(SIZE_N - 1.0)
#define MEAN_ITER 2
#define WAIT_T 3000
```

```
#define BCM2708_PERI_BASE    0x3F000000
#define GPIO_BASE           (BCM2708_PERI_BASE + 0x200000) /* GPIO controller */
define WAIT_ADC 500000 using namespace std;

int  mem_fd;

void *gpio_map;

struct timespec tim, tim2;

// I/O access
volatile unsigned *gpio;

// GPIO setup macros. Always use INP_GPIO(x) before using OUT_GPIO(x) or SET_GPIO_ALT(x,y)
#define INP_GPIO(g) *(gpio+((g)/10)) &= ~(7<<(((g)%10)*3))
#define OUT_GPIO(g) *(gpio+((g)/10)) |=  (1<<(((g)%10)*3))
#define SET_GPIO_ALT(g,a) *(gpio+(((g)/10))) |= (((a)<=3?(a)+4:(a)==4?3:2)<<(((g)%10)*3))

#define GPIO_SET *(gpio+7)  // sets bits which are 1 ignores bits which are 0
define GPIO_CLR *(gpio+10) // clears bits which are 1 ignores bits which are 0 define GET_GPIO(g) (*(gpio+13)&(1<<g)) // 0 if LOW, (1<<g) if HIGH define GPIO_PULL *(gpio+37) // Pull up/pull down
define GPIO_PULLCLK0 *(gpio+38) // Pull up/pull down clock /*functoins*/
void setup_io();
void send_data(double* val, unsigned char addr);
void read_from_pipe (int file);
void write_to_pipe (int file);
int do_scan(double data[], double angle[SIZE_N][SIZE_N][16], double theta_array[], int fd);
/*Global variable*/
double angle[SIZE_N][SIZE_N][16];
double theta_array[SIZE_N];
int fd;
void error(const char *msg)
{
   perror(msg);
   exit(1);
}
int handleClientRequest(int clientFD)
{
```

```
char buffer[256];

int n;

/*Scanc configureations*/ double data[SIZE_N*SIZE_N];

/************************************************************************\
    * You are about to change the GPIO settings of your computer.            *
    * Mess this up and it will stop working!                                 *
    * It might be a good idea to 'sync' before running this program          *
    * so at least you still have your code changes written to the SD-card!   *
    \************************************************************************/

// Set GPIO pins 18, 23 and 24 to output

// must use INP_GPIO before we can use OUT_GPIO

/*End scann configurations*/ while(0==0)
    {
            bzero(buffer,256);/*clearing the buffer*/ n = read(clientFD,buffer,255);/*reading from the client connectin*/ if (n < 0) /*error cheking*/
            {
                    error("ERROR reading from socket");
            }

/*recieve a close socket message*/
            if(strcmp(buffer,"close\n") == 0 || strcmp(buffer,"") == 0)
            {
                    return 0;
            }
            if(strcmp(buffer,"scann\n") == 0)
            {
                    if(do_scan(data,angle, theta_array, fd)==0)
                    {
                            n = write(clientFD,(char*)data,SIZE_N*SIZE_N*8);/*size of array*number of char per data*/
                    }
            }
```

```
      }
   return 0;
}
/*scan functiond*/
void setup_io();
void send_data(float angle, unsigned char addr);
/*main function, here the socket is configured and start to
 * run, waiting a request.*/
int main(int argc, char *argv[])
{
   int sockfd, newsockfd;
   socklen_t clientLen;
   struct sockaddr_un serv_addr, client_addr;
   /*Initialize the socket configuration*/
   sockfd = socket(AF_LOCAL, SOCK_STREAM, 0);
   if (sockfd < 0)
   {
      error("ERROR opening socket");
   }
   /*initialize address structure*/
   memset(&serv_addr, 0, sizeof(struct sockaddr_un)); /* Clear structure */
   serv_addr.sun_family = AF_LOCAL;
   strncpy(serv_addr.sun_path, MY_SOCK_PATH, sizeof(serv_addr.sun_path) - 1);
   unlink(serv_addr.sun_path);
   /*start bind*/
   if (bind(sockfd, (struct sockaddr *) &serv_addr, sizeof(struct sockaddr_un)) == -1)
   {
      handle_error("bind");
   }
   /*set the number of incomming connections*/
   if (listen(sockfd, LISTEN_BACKLOG) == -1)
   {
      handle_error("listen");
   }
   clientLen = sizeof(struct sockaddr_un);
```

```
/*Configure PI ports and phase shifter values*/
// Set up gpi pointer for direct register access
    setup_io();
    fd = wiringPiI2CSetup(0x54);
    /*wiringPiI2CWriteReg16(fd, 0x02, 0x20);*/
    wiringPiI2CWriteReg16(fd, 0x02, 0x20);
    INP_GPIO(18);
    INP_GPIO(23);
    INP_GPIO(24);
    INP_GPIO(17);
    INP_GPIO(27);
    INP_GPIO(22);
    INP_GPIO(5);
    INP_GPIO(6);
    INP_GPIO(13);
    INP_GPIO(26);
    OUT_GPIO(18);
    OUT_GPIO(23);
    OUT_GPIO(24);
    OUT_GPIO(17);
    OUT_GPIO(27);
    OUT_GPIO(22);
    OUT_GPIO(5);
    OUT_GPIO(6);
    OUT_GPIO(13);
    OUT_GPIO(26);
    GPIO_SET = 1<<18;
    GPIO_CLR = (1<<24)|(1<<23)|(1<<17)|(1<<27)|(1<<22)|(1<<5)|(1<<6)|(1<<13)|(1<<26);
    double dt = 0;
    double dp = 0;
    double dt2 = 0;
    double dp2 = 0;
    double dt3 = 0;
    double dp3 = 0;
    for(int i = 0; i < SIZE_N; i++) theta_array[i] = 180.0*sin((MIN_ANG + STEP_ANG*i)*M_PI/180.0);
```

```
for(int i = 0; i < SIZE_N; i++)
{
    for(int j = 0; j < SIZE_N; j++)
    {
        dt = theta_array[i];
        dp = theta_array[j];
        dt2 = 2*dt;
        dp2 = 2*dp;
        dt3 = 3*dt;
        dp3 = 3*dp;
        angle[i][j][0] = (int(360 + 360 + 360 - dt3)%360)*255.0/360;
        angle[i][j][1] = (int(360 + 360 + 360 - dt2)%360)*255.0/360;
        angle[i][j][2] = (int(360 + 360 + 360 - dt)%360)*255.0/360;
        angle[i][j][3] = (int(360 + 360 + 360 + 0)%360)*255.0/360;
        angle[i][j][4] = (int(360 + 360 + 360 - dt3 + dp2)%360)*255.0/360;
        angle[i][j][5] = (int(360 + 360 + 360 - dt2 + dp2)%360)*255.0/360;
        angle[i][j][6] = (int(360 + 360 + 360 - dt  + dp2)%360)*255.0/360;
        angle[i][j][7] = (int(360 + 360 + 360 + 0  + dp2)%360)*255.0/360;
        angle[i][j][8] =  (int(360 + 360 + 360 - dt3 + dp)%360)*255.0/360;
        angle[i][j][9] =  (int(360 + 360 + 360 - dt2 + dp)%360)*255.0/360;
        angle[i][j][10] = (int(360 + 360 + 360 - dt  + dp)%360)*255.0/360;
        angle[i][j][11] = (int(360 + 360 + 360 + 0  + dp)%360)*255.0/360;
        angle[i][j][12] = (int(360 + 360 + 360 - dt3 + dp3)%360)*255.0/360;
        angle[i][j][13] = (int(360 + 360 + 360 - dt2 + dp3)%360)*255.0/360;
        angle[i][j][14] = (int(360 + 360 + 360 - dt  + dp3)%360)*255.0/360;
        angle[i][j][15] = (int(360 + 360 + 360 + 0  + dp3)%360)*255.0/360;
    }
}
/*change the permissions on the unix socket, to allow access without sudo*/
chmod(MY_SOCK_PATH, 0666);
while (true)
{
  printf("Waiting request...\n");
  newsockfd = accept(sockfd, (struct sockaddr *) &client_addr, &clientLen);
  if (newsockfd == -1)
```

```c
    {
      handle_error("accept");
    } if (handleClientRequest(newsockfd) == 1)
    {
      break;
    }
  }
  printf("by\n");
  unlink(MY_SOCK_PATH);
  return 0;
}
int do_scan(double data[],double angle[SIZE_N][SIZE_N][16],double theta_array[], int fd)
{
        clock_t tStart = clock();
        int conv_reg;
        int result;
        double mean = 0.0;
        double val [8] = {0,0,0,0,0,0,0,0};
        uint8_t buf1 = 0;
        uint8_t buf2 = 0;
        printf("Minimum angle = %d\n", MIN_ANG);
        printf("Maximum angle = %d\n", MAX_ANG);
        printf("Step angle = %f\n", STEP_ANG);
  for(int i = 0; i < SIZE_N; i++)
  {
    for(int j = 0; j < SIZE_N; j++)
    {
                         val[0] = angle[i][j][0];
                         val[1] = angle[i][j][1];
                         val[2] = angle[i][j][2];
                         val[3] = angle[i][j][3];
                         val[4] = angle[i][j][4];
                         val[5] = angle[i][j][5];
```

```
            val[6] = angle[i][j][6];
            val[7] = angle[i][j][7];
            send_data(val, 0);
            val[0] = angle[i][j][8];
            val[1] = angle[i][j][9];
            val[2] = angle[i][j][10];
            val[3] = angle[i][j][11];
            val[4] = angle[i][j][12];
            val[5] = angle[i][j][13];
            val[6] = angle[i][j][14];
            val[7] = angle[i][j][15];
            send_data(val, 1);
            mean = 0.0;
            result = wiringPiI2CWriteReg16(fd, 0x07, 0);
            for(int z = 0; z < WAIT_ADC; z++) ((void)0);
            result = wiringPiI2CReadReg16(fd, 0x07);
            if(result < 0) printf("Error at %d,%d\n", i, j);
            buf1 = (result >> 10) & 0x3F;
            buf2 = result & 0x0F;
            conv_reg = (buf2 << 6) + buf1;
            mean = (conv_reg*3.3/1024 - 1.5269)/0.0174;
            data[j*SIZE_N + (SIZE_N - i - 1)] = mean;
        }
    }
    printf("Time taken: %.2fs\n", (double)(clock() - tStart)/CLOCKS_PER_SEC);
    //const unsigned int shape[] = {SIZE_N, SIZE_N};
    //cnpy::npy_save("arr1.npy", data, shape, 2, "w");
    //printf("saved\n");
    printf("Time taken: %.2fs\n", (double)(clock() - tStart)/CLOCKS_PER_SEC);
    return 0;
}
//
// Set up a memory regions to access GPIO
// setup_io
void setup_io()
```

```c
{
    /* open /dev/mem */
    if ((mem_fd = open("/dev/mem", O_RDWR|O_SYNC) ) < 0)
    {
        printf("can't open /dev/mem \n");
        exit(-1);
    }
    /* mmap GPIO */
    gpio_map = mmap(
        NULL,             //Any adddress in our space will do
        BLOCK_SIZE,       //Map length
        PROT_READ|PROT_WRITE,// Enable reading & writting to mapped memory
        MAP_SHARED,       //Shared with other processes
        mem_fd,           //File to map
        GPIO_BASE         //Offset to GPIO peripheral
    );
    close(mem_fd); //No need to keep mem_fd open after mmap
    if (gpio_map == MAP_FAILED) {
        printf("mmap error %d\n", (int)gpio_map);//errno also set!
        exit(-1);
    }
    // Always use volatile pointer!
    gpio = (volatile unsigned *)gpio_map;
}
void send_data(double* val, unsigned char addr)
{
//  unsigned char opt = (int) 0;
    uint8_t data[8];
    data[0] = (uint8_t) val[0];
    data[1] = (uint8_t) val[1];
    data[2] = (uint8_t) val[2];
    data[3] = (uint8_t) val[3];
    data[4] = (uint8_t) val[4];
    data[5] = (uint8_t) val[5];
    data[6] = (uint8_t) val[6];
```

```
    data[7] = (uint8_t) val[7];

for(int j = 0; j < WAIT_T; j++) ((void)0);

GPIO_CLR = (1<<18);
//  float angle = strtof(argv[1], NULL, 0);
    for(int i = 0; i < 8; i++)
    {
      for(int j = 0; j < WAIT_T; j++) ((void)0);

GPIO_CLR = 1<<24;

if ((data[0] >> i) & 0x01) GPIO_SET = 1<<23;

else GPIO_CLR = 1<<23;

if ((data[1] >> i) & 0x01) GPIO_SET = 1<<17;

else GPIO_CLR = 1<<17;

if ((data[2] >> i) & 0x01) GPIO_SET = 1<<27;

else GPIO_CLR = 1<<27;

if ((data[3] >> i) & 0x01) GPIO_SET = 1<<22;

else GPIO_CLR = 1<<22;

if ((data[4] >> i) & 0x01) GPIO_SET = 1<<5;

else GPIO_CLR = 1<<5;

if ((data[5] >> i) & 0x01) GPIO_SET = 1<<6;

else GPIO_CLR = 1<<6;

if ((data[6] >> i) & 0x01) GPIO_SET = 1<<13;

else GPIO_CLR = 1<<13;

if ((data[7] >> i) & 0x01) GPIO_SET = 1<<26;

else GPIO_CLR = 1<<26;

for(int j = 0; j < WAIT_T; j++) ((void)0);

GPIO_SET = 1<<24;
    }
    for(int j = 0; j < WAIT_T; j++) ((void)0);
// OPT bit
    GPIO_CLR = 1<<24;

GPIO_CLR = (1<<23)|(1<<17)|(1<<27)|(1<<22)|(1<<5)|(1<<6)|(1<<13)|(1<<26);

for(int j = 0; j < WAIT_T; j++) ((void)0);

GPIO_SET = 1<<24;

for(int j = 0; j < WAIT_T; j++) ((void)0);
// Address bit 0
```

```
    GPIO_CLR = 1<<24;

if (addr == 0) GPIO_CLR = (1<<23)|(1<<17)|(1<<27)|(1<<22)|(1<<5)|(1<<6)|(1<<13)|(1<<26);

else if (addr == 1) GPIO_SET = (1<<23)|(1<<17)|(1<<27)|(1<<22)|(1<<5)|(1<<6)|(1<<13)|(1<<26);

for(int j = 0; j < WAIT_T; j++) ((void)0);

GPIO_SET = 1<<24;

for(int j = 0; j < WAIT_T; j++) ((void)0);

// Address bit 1

GPIO_CLR = (1<<24)|(1<<23)|(1<<17)|(1<<27)|(1<<22);

GPIO_SET = (1<<5)|(1<<6)|(1<<13)|(1<<26);

for(int j = 0; j < WAIT_T; j++) ((void)0);

GPIO_SET = 1<<24;

for(int j = 0; j < WAIT_T; j++) ((void)0);

// Address bit 2

GPIO_CLR = (1<<24)|(1<<23)|(1<<5)|(1<<27)|(1<<13);

GPIO_SET = (1<<17)|(1<<6)|(1<<22)|(1<<26);

for(int j = 0; j < WAIT_T; j++) ((void)0);

GPIO_SET = 1<<24;

for(int j = 0; j < WAIT_T; j++) ((void)0);

// Address bit 3

GPIO_CLR = (1<<24)|(1<<23)|(1<<17)|(1<<5)|(1<<6);

GPIO_SET = (1<<27)|(1<<22)|(1<<13)|(1<<26);

for(int j = 0; j < WAIT_T; j++) ((void)0);

GPIO_SET = 1<<24;

for(int j = 0; j < WAIT_T; j++) ((void)0);

// Last sequence

GPIO_CLR = (1<<23)|(1<<24)|(1<<17)|(1<<27)|(1<<22)|(1<<5)|(1<<6)|(1<<13)|(1<<26);

for(int j = 0; j < WAIT_T; j++) ((void)0);

GPIO_SET = 1<<18;

}
```

Figure 1:
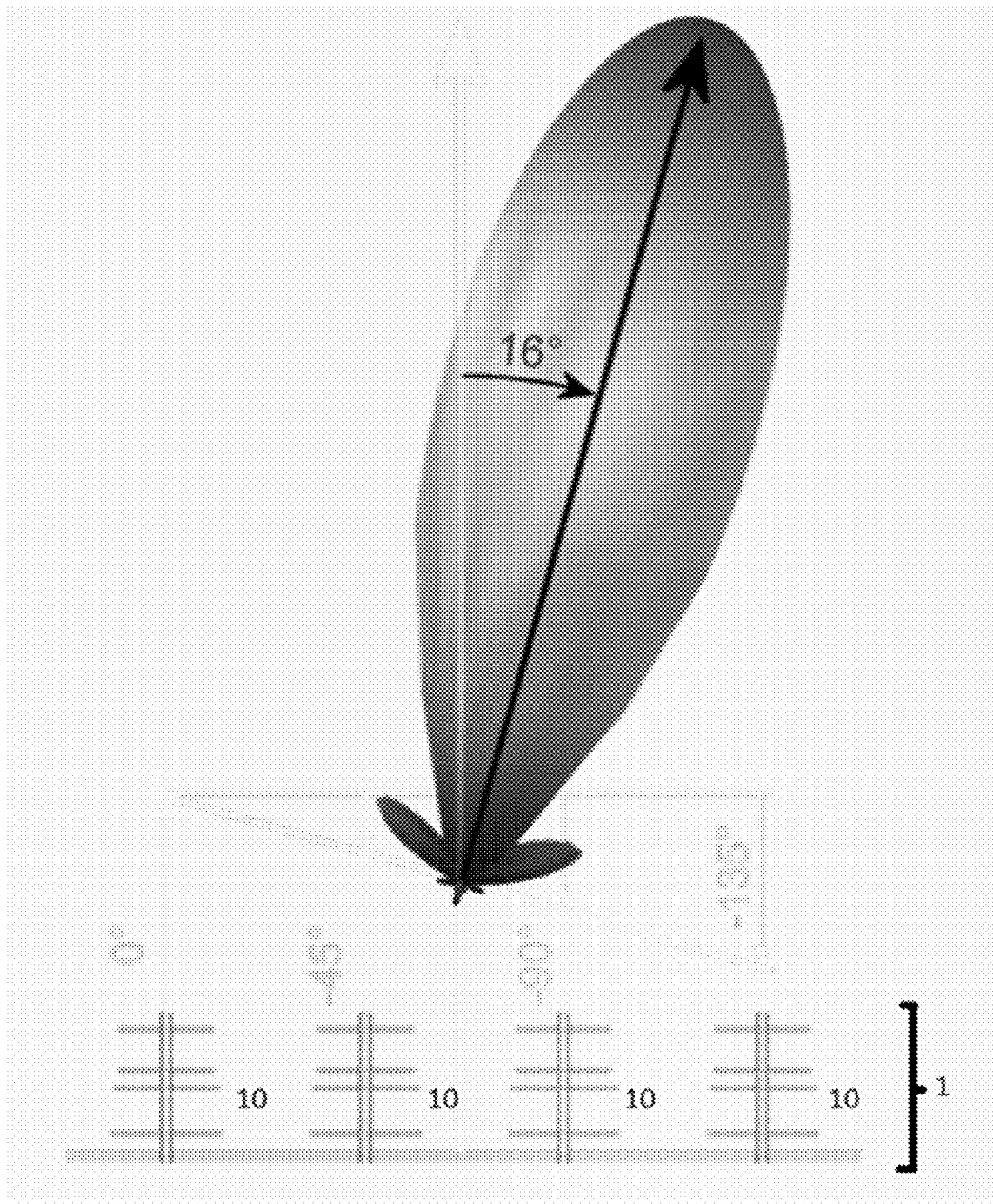
FIG. 1/10
Figure 2:
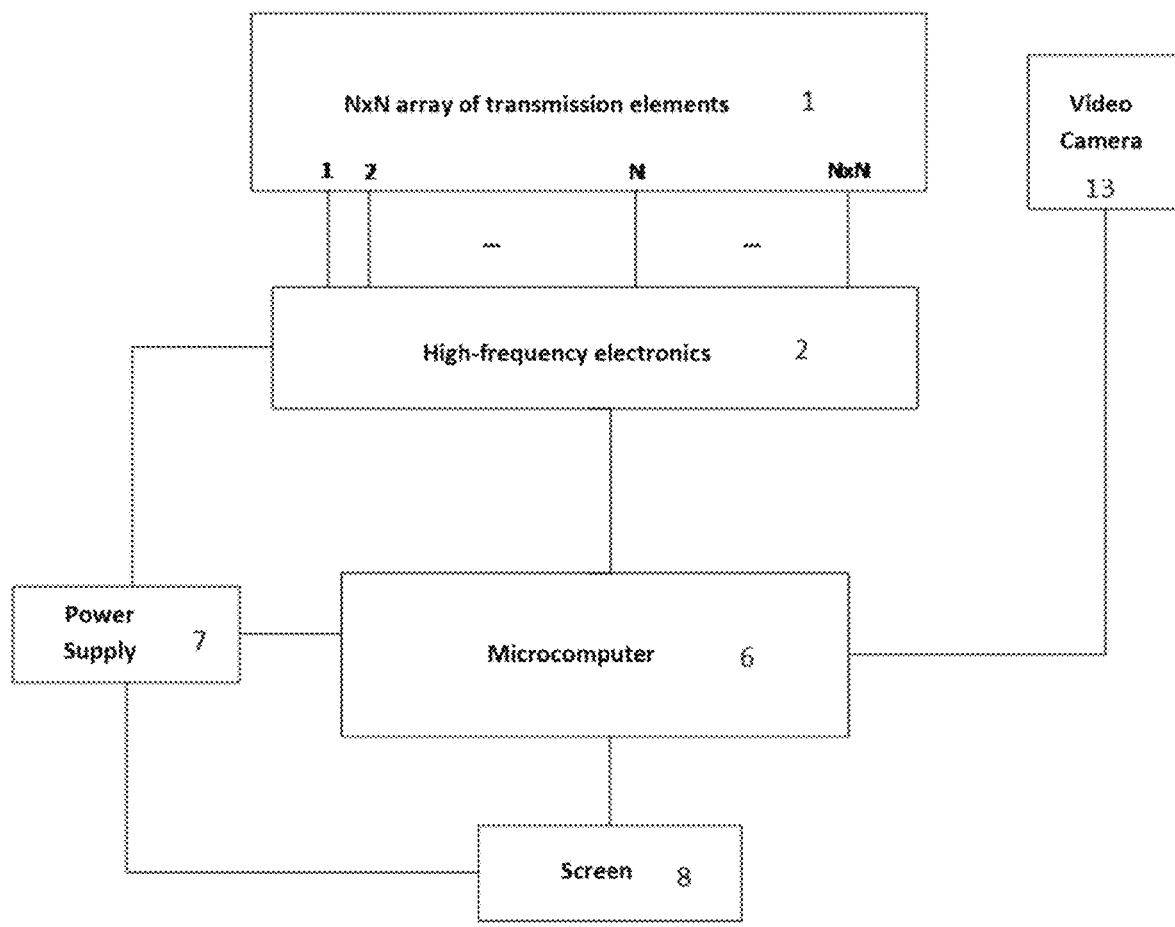
Figure 3:
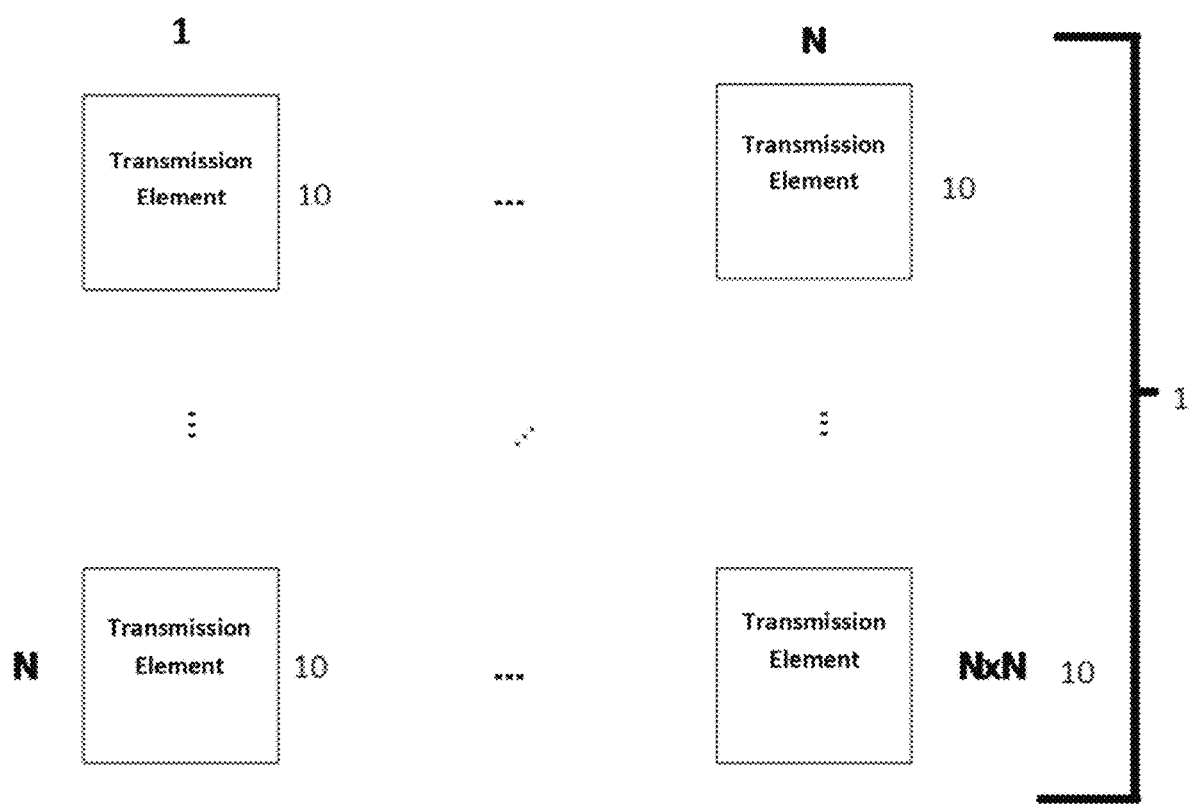
Figure 4:
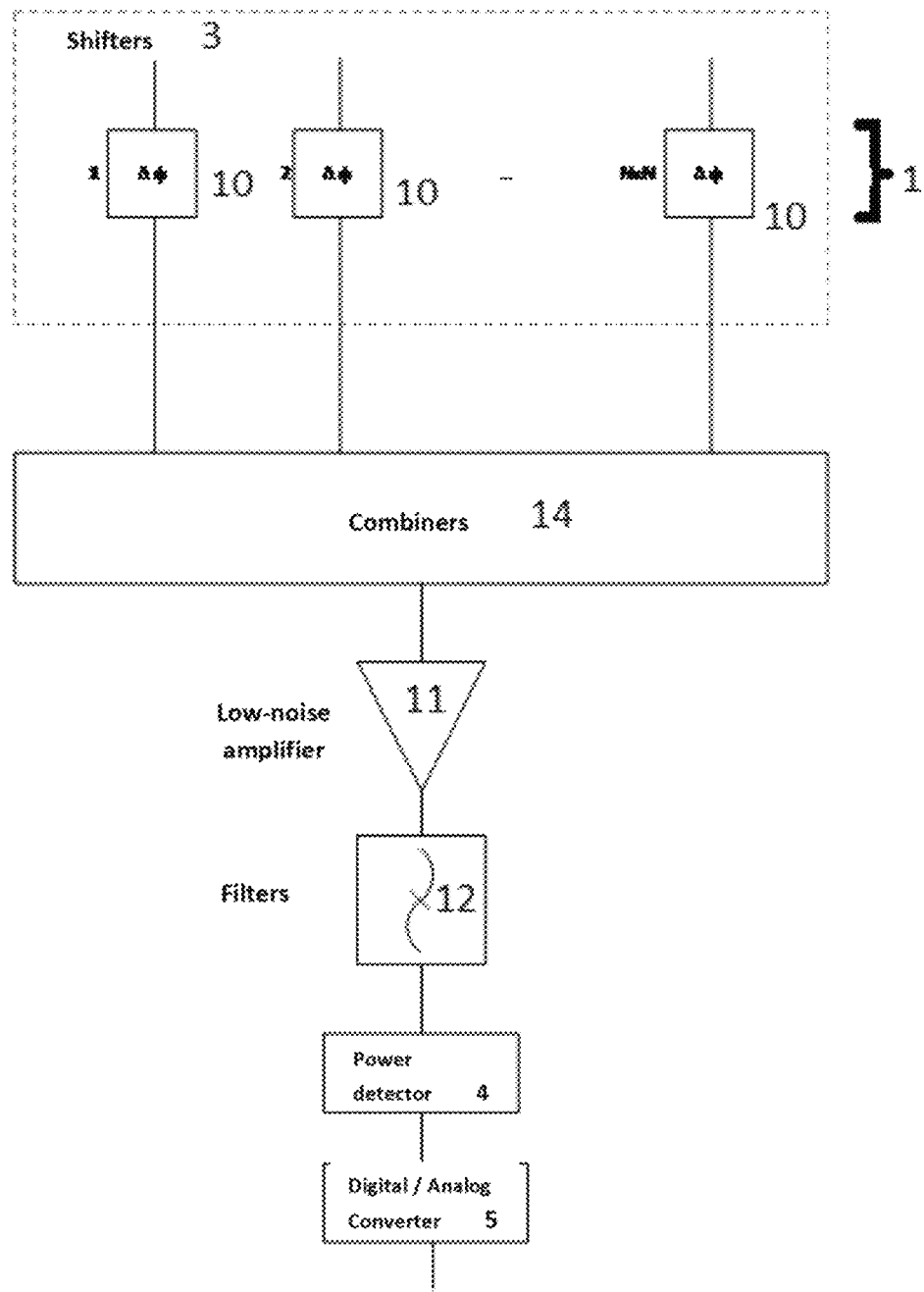

This figure describes the radiation pattern synthesized from 4 radiating elements (antennas). The pattern is found with an inclination of 16 degrees from the relative phase shifts between the antennas.

(1) Flat antenna array.
(11) Antenna or transmission element

FIG. 2/10

This figure presents a general block diagram of the invention.

(1) Flat antenna array.
(2) High frequency electronics
(3) Phase shifters
(4) Total power detector
(5) Digital analog converter (A/DC)
(6) Microcomputer
(7) Power Supply
(8) Screen
(9) Device Protection Casing
(10) Antenna or transmission element
(11) Amplifier
(12) Filter
(13) Video camera.
(14) Combiner

FIG. 3/10

This figure represents the geometric layout of the radiating elements, ordered in matrix form, without excluding other layouts.

(10) Antenna or transmission element

FIG. 4/10

This figure presents a general block diagram of the plate with the high frequency electronics.

(1) Flat antenna array.
(3) Phase shifters
(10) Antenna or transmission element
(11) Amplifier
(12) Filter
(14) Combiner

FIG. 5/10

This figure presents a model of an array of 4×4 antennas implemented in microstrip antennas for the PCS telephony band. (Scale in mm)

(1) Flat antenna array.
(10) Antenna or transmission element

FIG. 6/10

This figure shows the application example of 16 antennas, with amplifiers and outputs. It also has its model of high frequency electronics board using commercial components, without being restrictive to only this type of components.

(1) Flat antenna array.
(2) High frequency electronics
(3) Phase shifters
(4) Total power detector
(5) Digital analog converter (A/DC)
(6) Microcomputer
(7) Power Supply
(10) Antenna or transmission element
(11) Amplifier
(12) Filter, optional
(14) Combiner

FIG. 7/10

This figure specifically illustrates the antenna diagrams of application examples 1 to 4 using commercial components, without being limited to only these types of components.

(The diagrams of antennas 5 to 8, 9 to 13 and 14 to 16, are similar in terms of their distribution)

(3) Phase shifters
(7) Power Supply
(10) Antenna or transmission element
(14) Combiner

FIG. 8/10

This figure presents the diagram for a second circuit board used to convert the measured power into analog voltage.

(4) Total power detector
(7) Power Supply

FIG. 9/10

This figure presents the connection diagram of the microcomputer with the camera, the screen, the phase shifters and the A/DC.

(3) Phase shifters
(5) Digital analog converter (A/DC)
(6) Microcomputer
(8) Screen
(13) Video camera.

FIG. 10/10

The upper section of this figure shows a model of the implemented system.

(1) Flat antenna array.
(7) Power Supply
(8) Screen
(9) Device Protection Casing
(10) Antenna or transmission element
(13) Video camera.

The lower diagram presents an exploded view of the system, including the array of antennas, the optical camera, the protective casing, the screen, among other elements.

Application Example

One application example of this device without restricting its components is implemented using an array of 16 microstrip antennas, two high frequency electronic boards with commercial components and a commercial microcomputer.

Figure 6:
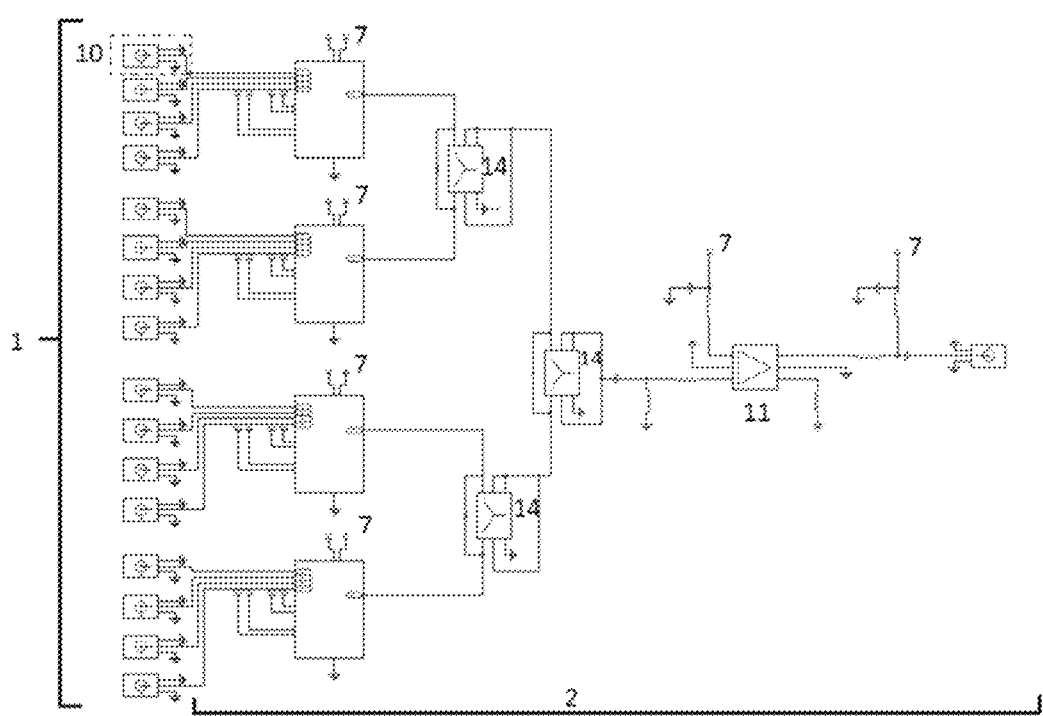
Figure 7:
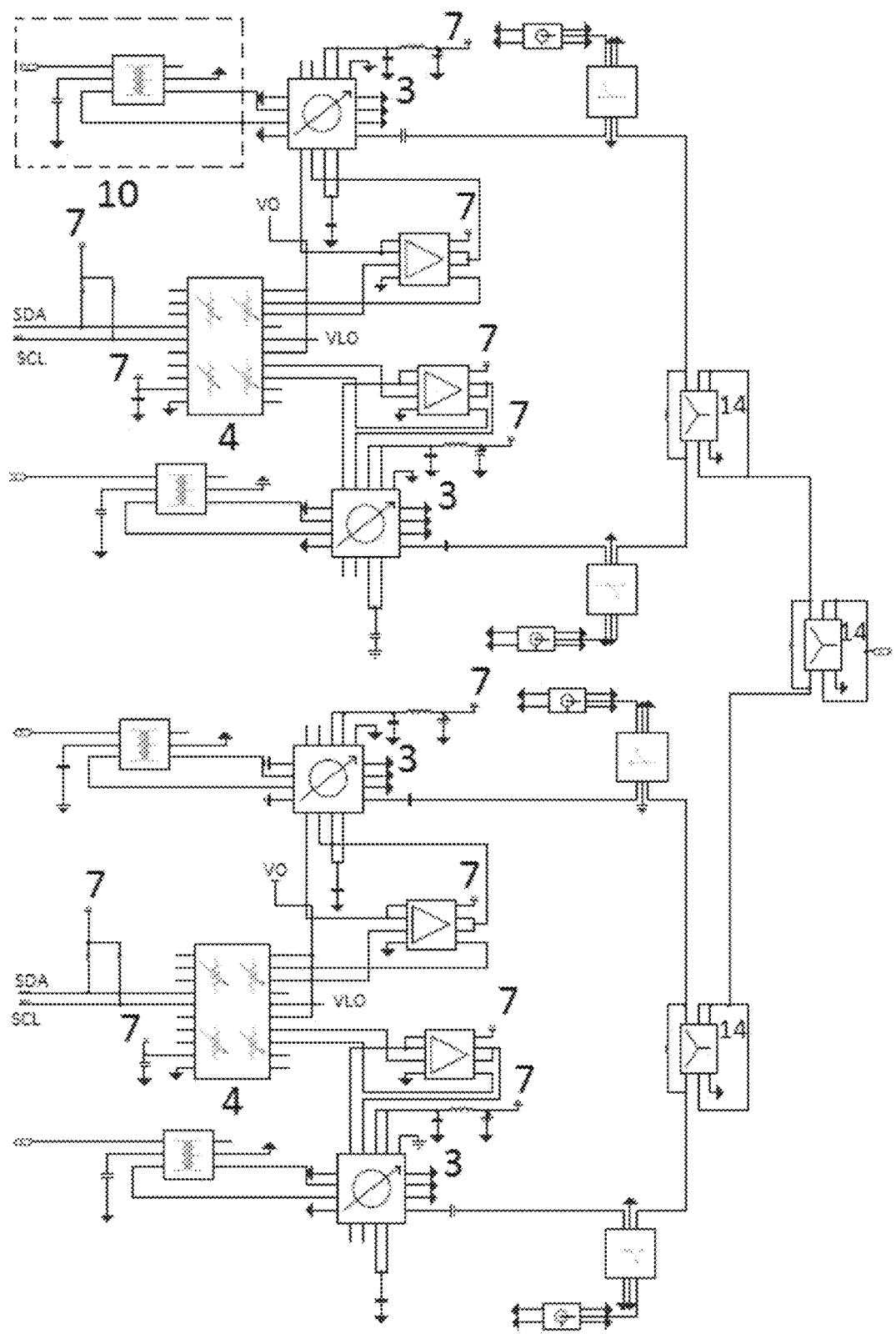
Figure 8:
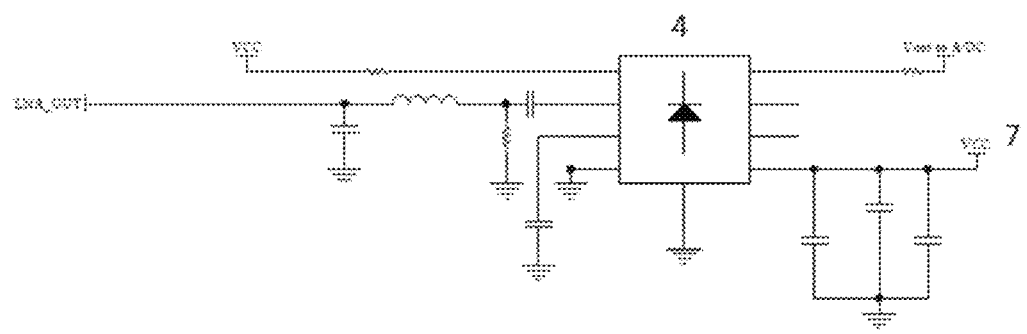
Figure 9:
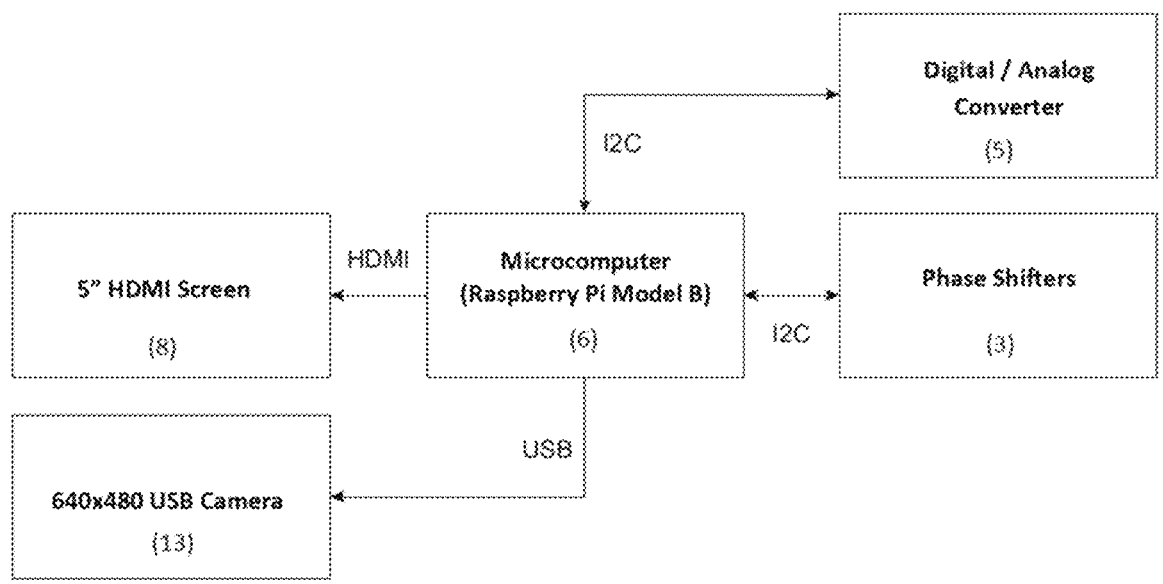

Images of the design of this device are shown in FIGS. 6/10, 7/10 and 8/10.

Figure 5:
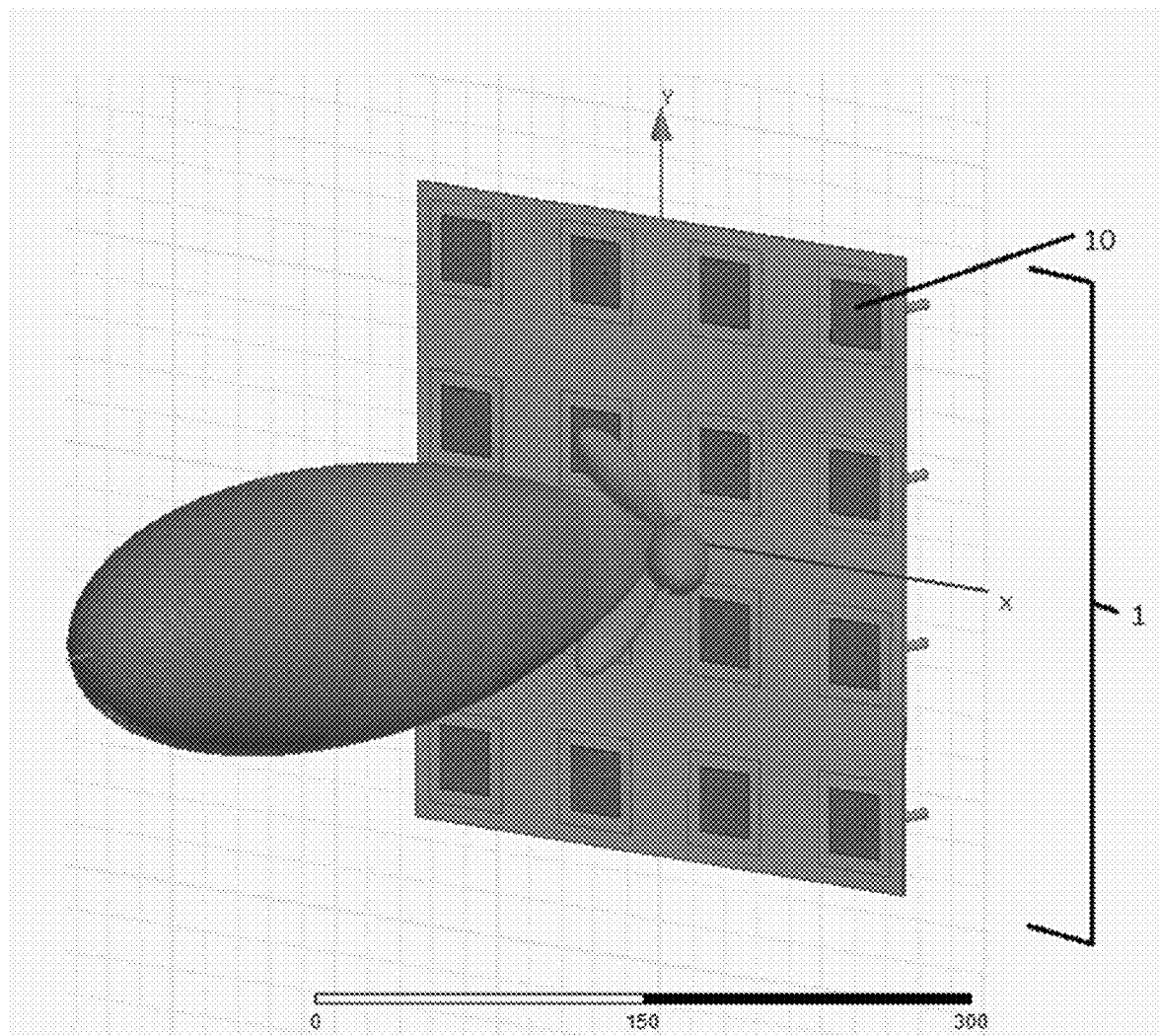

The microstrip antennas correspond to rectangular antennas tuned to 1.88 GHz and with an approximate bandwidth of 50 MHz. FIG. 5/10

The first high frequency electronic board has 16 Analog® HMC631LP3 vector modules, which allow shifting the phase and amplitude of the signal received by each of the antennas. These modulators are controlled with digital potentiometers DS3930 by Maxim®, which communicate with an I2c bus. The signal is then combined in-phase using 14 TCP-2-272 power combiners by Minicircuits®. The signal is then amplified with a low noise amplifier (LNA) model MAAL-007304 by MACOM®.

The second board has a Linear® LT5538 model power detector and is used to convert the measured power into an analog voltage.

The digital analog converter used is the ADS1115, which was commercially purchased with its test plate. The latter is connected to a Raspberry® pi 3 microcomputer.

The incorporation of filters is optional in this device, since the antennas only receive one frequency band.

Figure 10A:
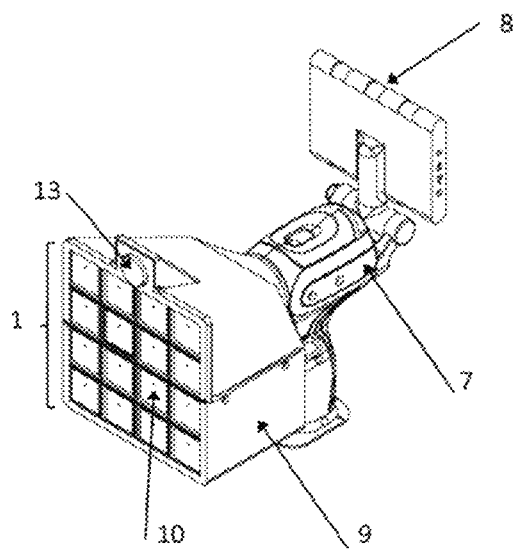
Figure 10B:
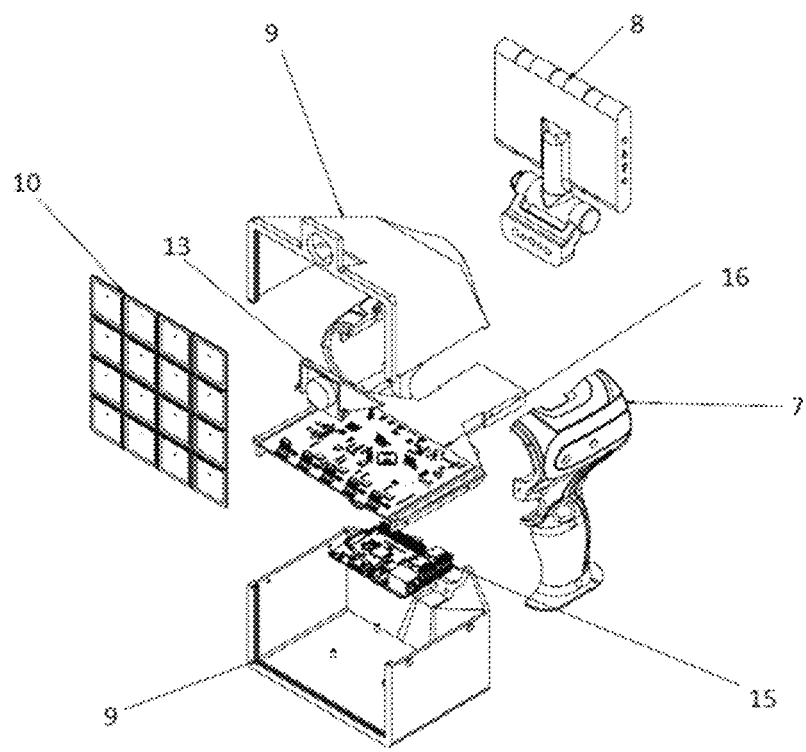

On the other hand, the optical digital camera, used in this prototype example, was 800×600 mm. In the example presented in FIG. 10/10, the optical camera can be seen over the array of antennas. It is also preferable to position the camera at the center of the antennas since this position simplifies the calculations for the radiofrequency camera.

The invention claimed is:

1. A compact and portable device for real-time detecting and locating electromagnetic emissions and visual images, which provides a RF radiation image superposed with a location visual image, comprising
   a flat array of antennas which are presented as a phased array, which uses a high-speed beam scan to capture radio frequency (RF) signals from scanned surfaces,
   where the phased array is capable of synthesizing a directional radiation reception beam, whose shape and direction can be controlled electrically;
   where each antenna can change the amplitude and phase and jointly generate the directional radiation reception beam;
   where the captured RF signal is processed by high-frequency electronics, which include a printed circuit board (PCB) or board: N×N phase shifters connected to antennas that change the relative phase of the received electromagnetic waves, such as radio frequency (RF) signals,
   where the output of each of the N×N phase shifters is combined in-phase into a single output of the captured RF signal, this RF signal is amplified and filtered, restricting and purifying the captured RF signal, reaching a total power detector where the total power of the captured radio frequency (RF) signal is detected as an analog voltage, which in turn is converted into a digital signal by means of an analog to digital converter;
   in addition, there is a video camera, in the same focal direction as the phased array, that produces a visual image;
   the device also includes a microcomputer that:
   first, is responsible for controlling and synchronizing the phased array, phase shifters, amplifiers and filters to create a two-dimensional radiofrequency (RF) image from the RF captured signals, which is post-processed by establishing the location of the radiofrequency (RF) emissions;
   second, is responsible for overlaying the visual images obtained by the camera with the radiofrequency (RF) images and display them on-screen; and
   third, is responsible for executing an algorithm that provides a user interface.

2. The device of claim 1, wherein the antenna array comprises 64 to 4 antennas, preferably 16 antennas or transmission elements, laid out as a matrix, which are also capable of detecting multiple bands in the emission frequency range of mobile devices, or in the frequency range of mobile and/or Wifi devices, such as the 700-900 MHz, 1700-2100 MHz, 2400-2700 MHz and 5000 MHz bands.

3. The device of claim 1, wherein the synthesis of a transmission beam in an arbitrary direction through the phased array, is bounded at 90×90 degrees.

4. The device of claim 2, wherein the synthesis of a transmission beam in an arbitrary direction through the phased array, is bounded at 90×90 degrees.

5. The device of claim 1, wherein the video camera is digital and shows the area in which the radiofrequency RF signal is to be detected.

6. The device of claim 1, wherein the microcomputer sends control signals that allow shifting the phase of each of the phase shifters included in the high frequency electronic board, where it is also able to synchronize the acquisition of optical and radio frequency images with said control signals.

7. The device of claim 1, wherein the minicomputer uses multiple Gaussian detection algorithms during post-processing to establish the location of radio frequency (RF) emissions, which determine the number of emitters and locate the electromagnetic emissions in the radiofrequency (RF) image.

8. The device of claim 1, wherein the visual image captured by the video camera is overlaid with the radiofrequency (RF) detection and place markers at the radio frequency capture sites (RF).

* * * * *